(12) United States Patent
Watazawa

(10) Patent No.: US 8,471,930 B2
(45) Date of Patent: Jun. 25, 2013

(54) IMAGE CAPTURING APPARATUS AND IMAGE PROCESSING APPARATUS

(75) Inventor: Naoko Watazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/957,963

(22) Filed: Dec. 1, 2010

(65) Prior Publication Data

US 2011/0141319 A1    Jun. 16, 2011

(30) Foreign Application Priority Data

Dec. 16, 2009  (JP) ................................. 2009-285741
Oct. 20, 2010  (JP) ................................. 2010-235878

(51) Int. Cl.
*H04N 5/33*         (2006.01)
*H04N 5/262*        (2006.01)

(52) U.S. Cl.
USPC ...................... 348/240.2; 348/240.1; 348/164

(58) Field of Classification Search
USPC ......................................... 348/240.99–240.3
See application file for complete search history.

(56) References Cited

U.S. PATENT DOCUMENTS

| | | | |
|---|---|---|---|
| 7,035,479 B2 * | 4/2006 | Coffland | 382/298 |
| 7,848,628 B2 * | 12/2010 | Ujisato et al. | 396/72 |
| 2003/0025812 A1 * | 2/2003 | Slatter | 348/240.2 |
| 2007/0040904 A1 * | 2/2007 | Kondo et al. | 348/51 |
| 2009/0021600 A1 * | 1/2009 | Watanabe | 348/222.1 |
| 2010/0079528 A1 * | 4/2010 | Yamamoto | 347/16 |
| 2010/0079582 A1 * | 4/2010 | Dunsmore et al. | 348/46 |
| 2010/0238294 A1 * | 9/2010 | Hogasten et al. | 348/164 |
| 2010/0277620 A1 * | 11/2010 | Iijima et al. | 348/240.1 |

FOREIGN PATENT DOCUMENTS

| | | |
|---|---|---|
| JP | 2000-259823 | 9/2000 |
| JP | 2004-200950 | 7/2004 |
| JP | 2006-067521 | 3/2006 |
| JP | 2006-332743 | 12/2006 |
| JP | 2006332743 | * 12/2006 |

* cited by examiner

*Primary Examiner* — Roberto Velez
*Assistant Examiner* — Pritham Prabhakher
(74) *Attorney, Agent, or Firm* — Cowan, Liebowitz & Latman, P.C.

(57) ABSTRACT

Upon capturing an image, distances to subjects are measured. The captured image is divided into a plurality of different layers that each has a set distance interval, so that subjects which are located within the same distance range belong to the same layer. Furthermore, enlargement ratios are set for the plurality of divided layers to execute resizing processing, and the resized layers are composited, so that layers having shorter distances to a subject are overlaid as upper layers, thereby obtaining an image which is resized for respective distances to subjects.

10 Claims, 16 Drawing Sheets

X-Y PLANE: CORRESPONDING TO IMAGE CAPTURING FRAME A

F I G. 10

| IMAGE FILE NAME | DATE AND TIME | X-Y COORDINATES | SUBJECT DISTANCE |
|---|---|---|---|
| 001.jpg | 2009/01/01 10:10 | (0, 1) | 2m |
| | | (0, 2) | 2m |
| | | (0, 3) | 2m |
| | | . | . |
| | | . | . |
| | | . | . |
| | | . | . |
| | | (Xn, Ym) | 5m |
| 002.jpg | 2009/01/01 10:12 | (0, 1) | 7m |
| | | (0, 2) | 7m |
| | | (0, 3) | 4m |
| | | . | . |
| | | . | . |
| | | . | . |
| | | . | . |
| | | (Xn, Ym) | 5m |

IMAGE CAPTURING APPARATUS AND IMAGE PROCESSING APPARATUS

BACKGROUND OF THE INVENTION

1. Field of the Invention

The present invention relates to a technique for editing an image having the distance information for between a subject and an image capturing apparatus at the time of capturing the image.

2. Description of the Related Art

An image capturing apparatus such as a digital camera has a zoom function, and can capture an image of a distant subject at a desired magnification. The zoom function includes an optical zoom function realized by changing a focal length between an optical system and an image sensor, and an electronic (digital) zoom function realized by electronically zooming in an image signal output from the image sensor.

Japanese Patent Laid-Open No. 2004-200950 discloses a technique for capturing an image at a desired angle of view without any zoom operation by simultaneously displaying a plurality of different through images having different angles of view using the digital zoom function, and prompting the user to select one of these through images.

Some image capturing apparatuses have a function which measures the distance to a subject to be captured. Japanese Patent Laid-Open No. 2006-067521 discloses a technique for measuring distances from an image capturing apparatus to subjects, dividing a captured image into a plurality of regions according to the measured distances, and applying filters having different frequency characteristics to these regions.

The general digital zoom function used in, for example, Japanese Patent Laid-Open No. 2004-200950 zooms in all pieces of image information within an image capturing range upon execution of zoom-in processing. That is, in framing including a background and a main subject, when the zoom function is used to capture a large image of the main subject, it is often the case that the desired background does not fall within the angle of view. For this reason, in order to capture a large image of the main subject while the desired background falls within the angle of view, the main subject has to be moved closer to the image capturing apparatus. However, when an image is to be captured using a light-emitting device such as a strobe, since the close main subject is mainly irradiated with strobe light, an image of the main subject suffers a highlight-loss, and an image having a luminance difference between the background and main subject is unwantedly captured.

Also, as described in Japanese Patent Laid-Open No. 2006-067521, an image is divided into regions according to the distances to subjects, and digital zoom processes having different magnifications according to the distances associated with these regions are applied, thereby creating a pseudo composite photograph in which a large image of a main subject is captured while a background falls within an angle of view.

However, when the digital zoom processes having different magnifications according to the distances associated with respective regions are applied, the user cannot easily identify the distance to the main subject, and it is not easy for the user to set a desired magnification by selecting a subject within an arbitrary distance range.

SUMMARY OF THE INVENTION

The present invention has been made in consideration of the aforementioned conventional problems. The present invention provides a technique that divides a captured image into different layers according to distances from an image capturing apparatus to subjects, and allows the user to easily identify and select a layer including a main subject.

Also, the present invention provides a technique that applies different digital zoom processes for a layer including a main subject and another layer (for example, a background) to layers obtained by dividing an image according to the distances, and allows the user to capture images of the background and main subject at different desired angles of view.

The present invention in its first aspect provides an image capturing apparatus comprising: an image capturing unit which captures an image of subjects; a distance measurement unit which measures distances from the image capturing apparatus to the subjects; a dividing unit which divides the image of the subjects captured by the image capturing unit into a plurality of different layers to have a set distance interval according to the distances from the image capturing apparatus; a display unit which displays a display image which represents the plurality of layers divided by the dividing unit and subjects which respectively belong to the plurality of layers; and a setting unit which sets the distance interval, wherein the display unit updates the display image in response to a new distance interval set by the setting unit.

Further features of the present invention will become apparent from the following description of exemplary embodiments (with reference to the attached drawings).

BRIEF DESCRIPTION OF THE DRAWINGS

FIG. 10 shows an example of a meta information table included in an image;

DESCRIPTION OF THE EMBODIMENTS

Preferred embodiments of the present invention will be described in detail hereinafter with reference to the drawings. Note that the embodiment to be described below will exemplify a case in which the present invention is applied to a digital camera, as an example of an image capturing apparatus, which can measure distances to subjects and can capture an image.

Figure 1:
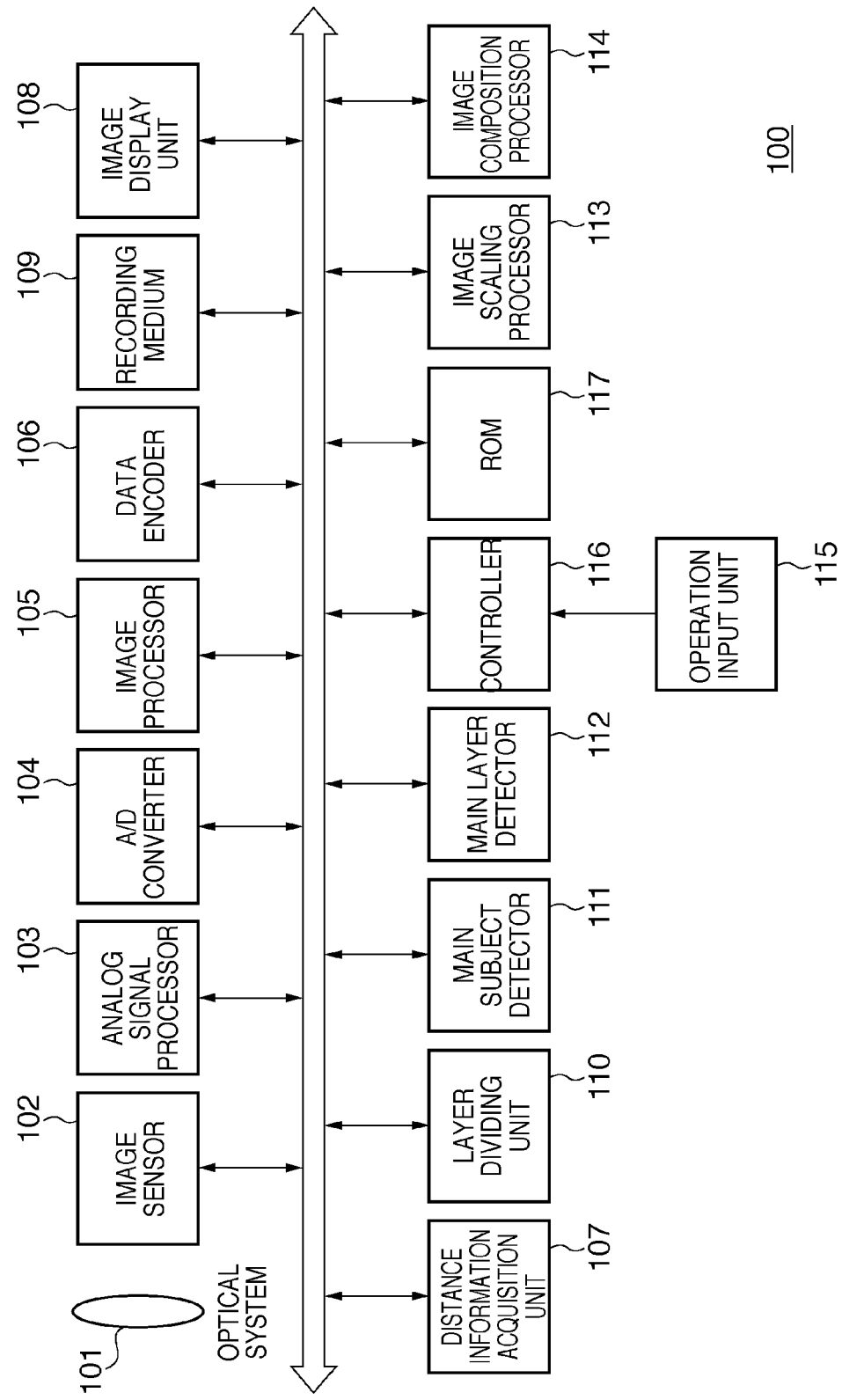
FIG. 1 is a block diagram showing the functional arrangement of a digital camera according to the first embodiment.

FIG. 1 is a block diagram showing the functional arrangement of a digital camera according to an embodiment of the present invention. A controller 116 is, for example, a CPU, and controls operations of respective blocks included in a digital camera 100. More specifically, the controller 116 reads out operation programs, which are stored in, for example, a ROM 117, of the respective blocks included in the digital camera 100, expands them on a RAM (not shown), and executes the mapped programs, thereby controlling the operations of the respective blocks included in the digital camera 100. The ROM 117 is a rewritable non-volatile memory, and stores, for example, settings such as an output resolution and recording image quality, which are associated with an image capturing operation of the digital camera 100, and setting values required for the operations of the respective blocks.

An optical system 101 is a lens group including an imaging lens and focal lens, and forms a subject image on an image sensor 102 by focusing reflected light from a subject. The image sensor 102 includes, for example, a CMOS sensor or CCD. The image sensor 102 photoelectrically converts the subject image formed by the optical system 101 for respective pixels according to light intensities, and outputs an analog image signal to an analog signal processor 103. The analog signal processor 103 applies signal processes such as noise removal and gain control to the input analog image signal, and outputs the processed signal to an A/D converter 104. The A/D converter 104 A/D-converts the analog image signal which has undergone the signal processes by the analog signal processor 103, and outputs an obtained digital image to an image processor 105. The image processor 105 applies image processes such as exposure correction, γ correction, and white balance adjustment to the digital image output from the A/D converter 104 according to the setting values stored in, for example, the ROM 117. A data encoder 106 applies an encoding process to the digital image that has undergone the image processes according to a data format which is stored in, for example, the ROM 117 and required to record an image in a recording medium 109 (to be described later), and outputs the encoded image to the recording medium 109. An image display unit 108 is, for example, a display device such as a compact LCD, and serves as an electronic viewfinder of the digital camera 100 by through-displaying the digital image output from the image processor 105. The image display unit 108 can display images stored in the recording medium 109. The recording medium 109 is, for example, a built-in memory included in the digital camera 100 or an external recording medium such as a memory card or HDD, which is detachably attached to the digital camera 100, and records images captured by the digital camera 100.

A distance information acquisition unit 107 divides a subject image into a plurality of regions, measures distances to subjects for respective regions, and outputs the obtained three-dimensional distance information (range image). The operation of the distance information acquisition unit 107 will be described in detail below with reference to FIG. 2 and FIGS. 3A to 3C.

Figure 2:
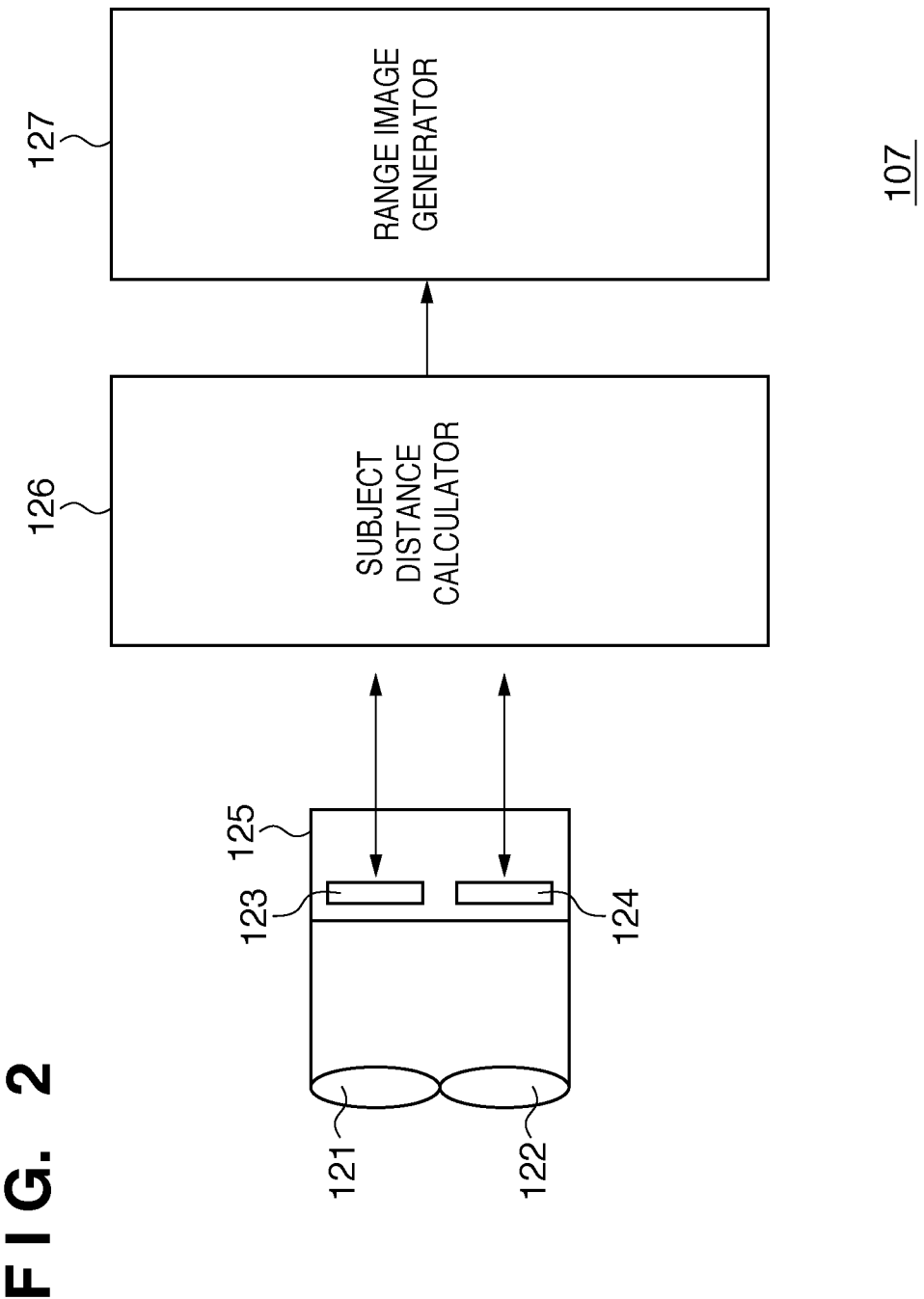
FIG. 2 is a diagram for explaining a distance information acquisition unit included in the digital camera.
Figure 3A:
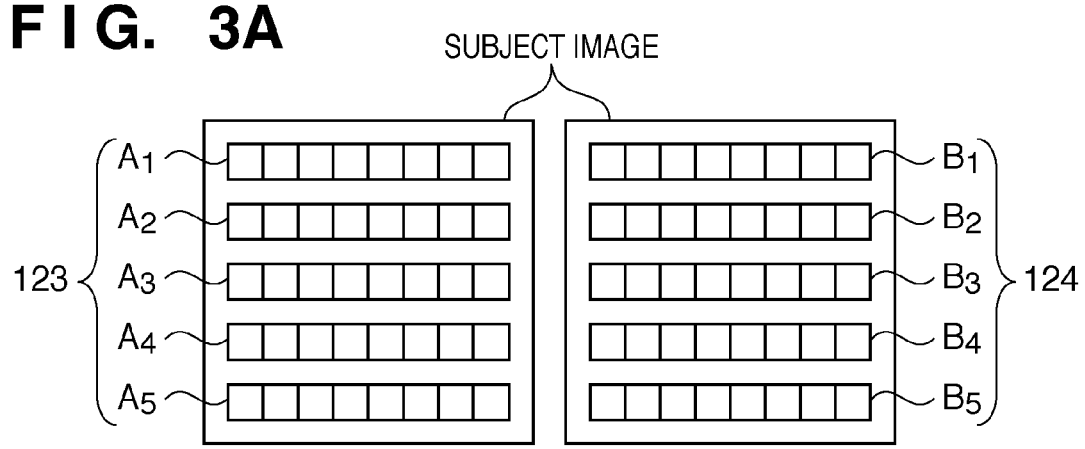
FIGS. 3A, 3B, and 3C are views for explaining a distance measurement sensor.

FIG. 2 is a diagram showing the internal arrangement of the distance information acquisition unit 107. The distance information acquisition unit 107 includes a sensor unit 125, which receives reflected light from a subject. In the sensor unit 125, n stages of pairs of line sensors 123 and 124, which are arranged to have a predetermined interval in the horizontal direction, are arranged in the vertical direction. Before the line sensors, the sensor unit 125 includes n stages of lenses 121 and 122 corresponding with the line sensors. An example shown in FIG. 3A illustrates a sensor unit which includes five stages of lenses and line sensors and is included in the distance information acquisition unit 107, for the sake of simplicity. The line sensors 123 and 124 are CCD line sensors on each of which, for example, a plurality of charge-coupled devices are arranged in line, and respectively include sensors $A_1$ to $A_5$ and $B_1$ to $B_5$. On each line sensor, the corresponding lens forms a subject image. The line sensors 123 and 124 receive subject images formed by the lenses 121 to 122 for only a predetermined time period, photoelectrically convert them into analog image signals, and output these signals to a subject distance calculator 126. The subject distance calculator 126 calculates pieces of distance information to subjects in a plurality of regions obtained by dividing a subject image based on the principle of triangulation using the analog image signals of the respective pixels of the respective line sensors, which are output from the line sensors 123 and 124.

Figure 3B:
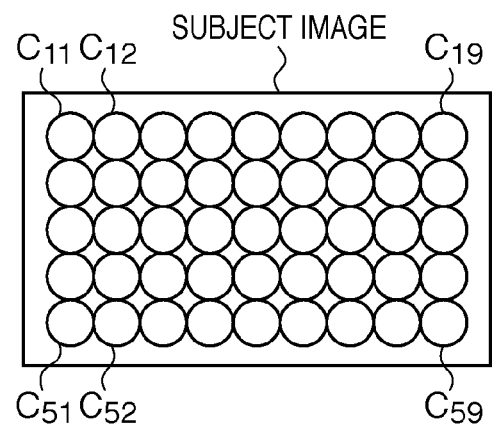
Figure 3C:
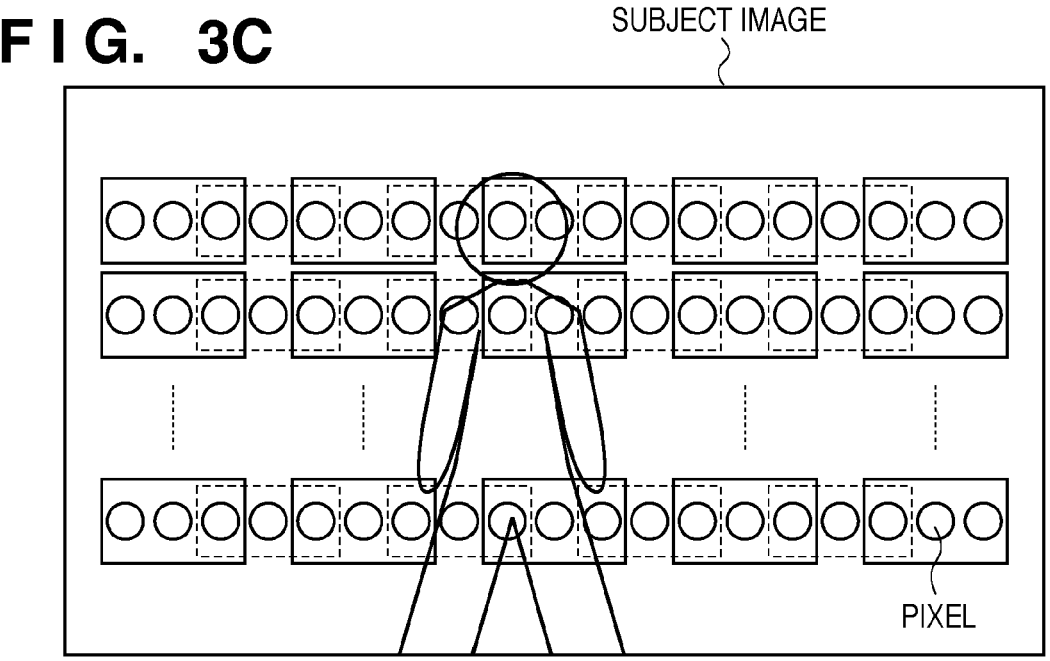

As shown in FIG. 3B, when nine columns of distance measurement points are arranged for each pair of line sensors of each stage, distance measurements are done in 45 (=5×9) regions ($C_{11}, C_{12}, \ldots, C_{19}, C_{21}, \ldots, C_{59}$) obtained by dividing a subject image. In this case, in distance measurement regions $C_{nm}$ (n is a positive integer equal to or smaller than 5, and m is a positive integer equal to or smaller than 9), a distance to a subject is calculated based on relative positional deviation amounts of line images obtained from the line sensors $A_n$ and $B_n$ of the n-th stage. More specifically, the detection outputs (luminance signal waveforms) of the line sensors are divided into nine columns of given periods in the horizontal direction, and distances to subjects in m regions of the respective stages are calculated by calculating deviation amounts having maximum correlations of waveforms by correlation calculations using waveform values of the divided periods. In the example shown in FIG. 3C, when each stage of the line sensors 123 and 124 have 19 pixels, distances to subjects of nine columns are calculated based on relative positional deviation amounts of line images for three pixels.

Note that the number of distance measurement regions is not limited to the aforementioned 45 (=5×9) regions, and it can be set depending on the resolution of the line sensors and the number of line sensors to be arranged.

Figure 4:
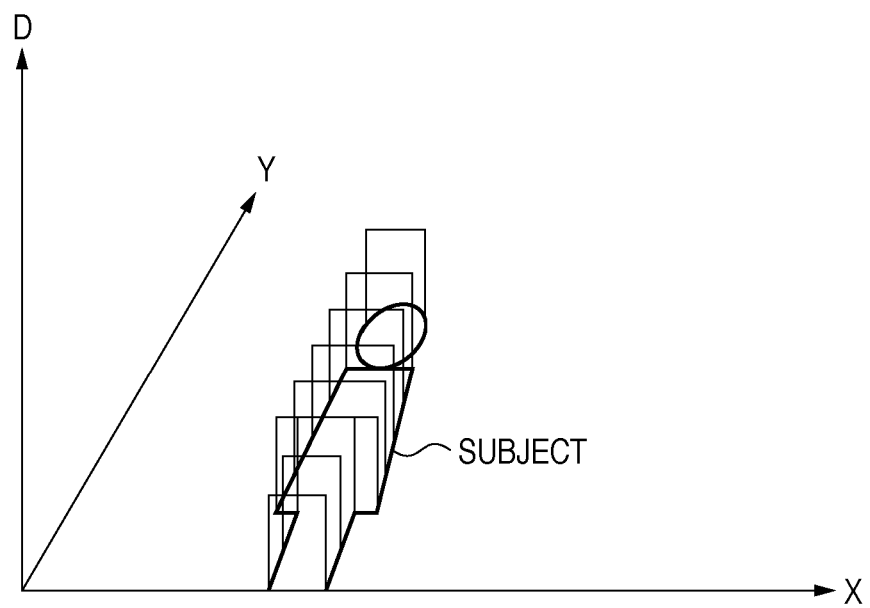
FIG. 4 is a view for explaining a three-dimensional range image.

A range image generator 127 generates a three-dimensional range image shown in FIG. 4 based on pieces of distance information to subjects of the respective distance measurement regions obtained by the subject distance calculator 126, and pieces of position information of the respective distance measurement regions. The range image is configured by a coordinate system, which has the horizontal direction with respect to a subject image to be captured as an X axis, the vertical direction as a Y axis, and a distance to a subject in the normal direction to an X-Y plane as a D axis (Depth axis).

A layer dividing unit 110 divides the digital image output from the image processor 105 into a plurality of layers depending on the distances to subjects based on the three-dimensional range image output from the distance information acquisition unit 107. More specifically, the layer dividing unit 110 classifies pieces of distance information to subjects included in the range image into respective predetermined distance ranges, and creates a plurality of layers by dividing an image so that images within regions corresponding to distance measurement regions that are classified by the same distance range belong to the same layer. The layer dividing unit 110 sets pieces of distance information to a reference subject for respective layers obtained by dividing an image, and controls the ROM 117 to store the layers and the positional relationships of the layers. The aforementioned predetermined distance range is an interval of a distance (for example, a minimum value of a distance to be classified) to a reference subject, and is set by the user using an operation input unit 115 (to be described later). The controller 116 inputs information of the set predetermined distance range to the layer dividing unit 110.

Figure 13A:
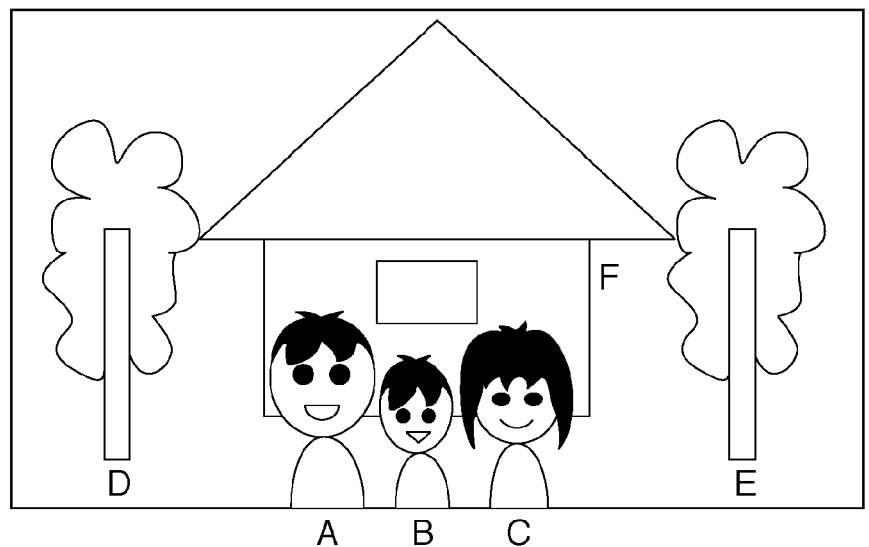
FIGS. 13A and 13B are views showing the positional relationship between the digital camera and subjects according to the first embodiment.

The operation of the layer dividing unit 110 and a display example of the image display unit 108 upon capturing an image of framing shown in FIG. 13A by the digital camera 100 will be described below. Subjects to be captured include a subject A 1202 (person), a subject B 1203 (person), a subject C 1204 (person), a subject D 1201 (tree), a subject E 1205 (tree), and a subject F 1206 (house). The positional relationship among the respective subjects is, as shown in FIG. 13B, using the distances from the image capturing apparatus.

Figure 12A:
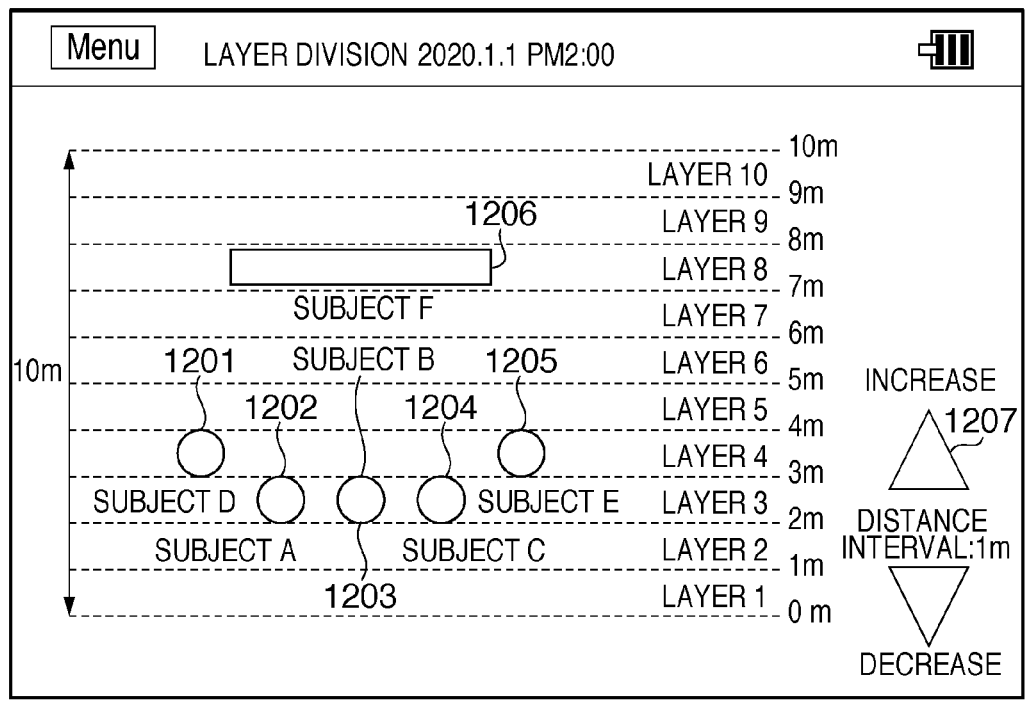
FIGS. 12A and 12B are views for explaining layers divided based on set distance intervals according to the first embodiment.
Figure 13B:
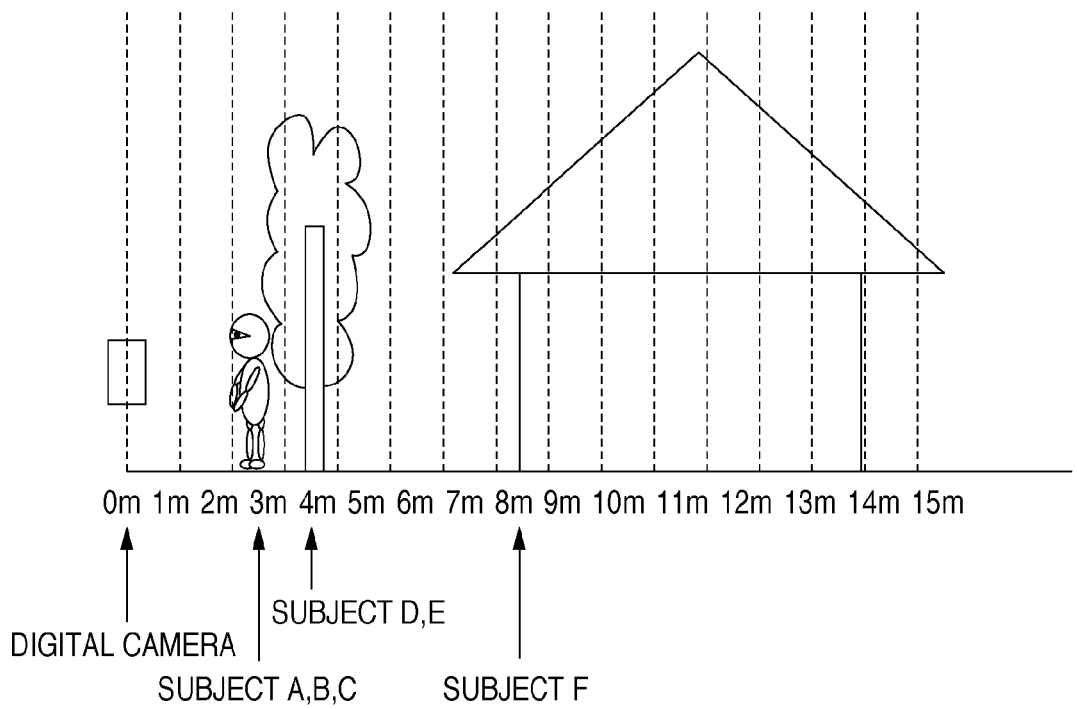

FIG. 13B represents that the subjects A, B, and C were located at a position of 2 m, the subjects D and E were located at a position of 3 m, and the subject F was located at a position of 7 m with respect to the digital camera 100 at the time of image capturing. At this time, a range image obtained by the distance measurement operation at the time of image capturing mainly includes distance measurement regions having pieces of distance information=2 m, 3 m, and 7 m to the subjects. For example, when the user sets to divide a captured image into layers at 1-m intervals by operating the operation input unit 115, the layer dividing unit 110 divides a digital image input from the image processor 105 as follows. The layer dividing unit 110 refers to a three-dimensional range image output from the distance information acquisition unit 107, and divides the digital image at 1-m intervals so that images having distances to the subjects which fall within the same distance range belong to the same layer. At this time, the image display unit 108 displays grid lines having the set 1-m intervals, layer names of the respective distance ranges, and the positional relationship of the subjects, as shown in FIG. 12A. More specifically, the layer dividing unit 110 divides so that the subjects A, B, and C belong to layer 3 having a distance=2 m to a reference subject, and the subjects D and E belong to layer 4 having a distance=3 m to the reference subject. Also, the layer dividing unit 110 divides so that the subject F belongs to layer 8 having a distance=7 m to the reference subject. The image display unit 108 displays based on the division results to show that the subjects A, B, and C are classified into layer 3 between the grid lines of 2 m and 3 m, the subjects D and E are classified into layer 4 between 3 m and 4 m, and the subject F is classified into layer 8 between 7 m and 8 m.

Figure 12B:
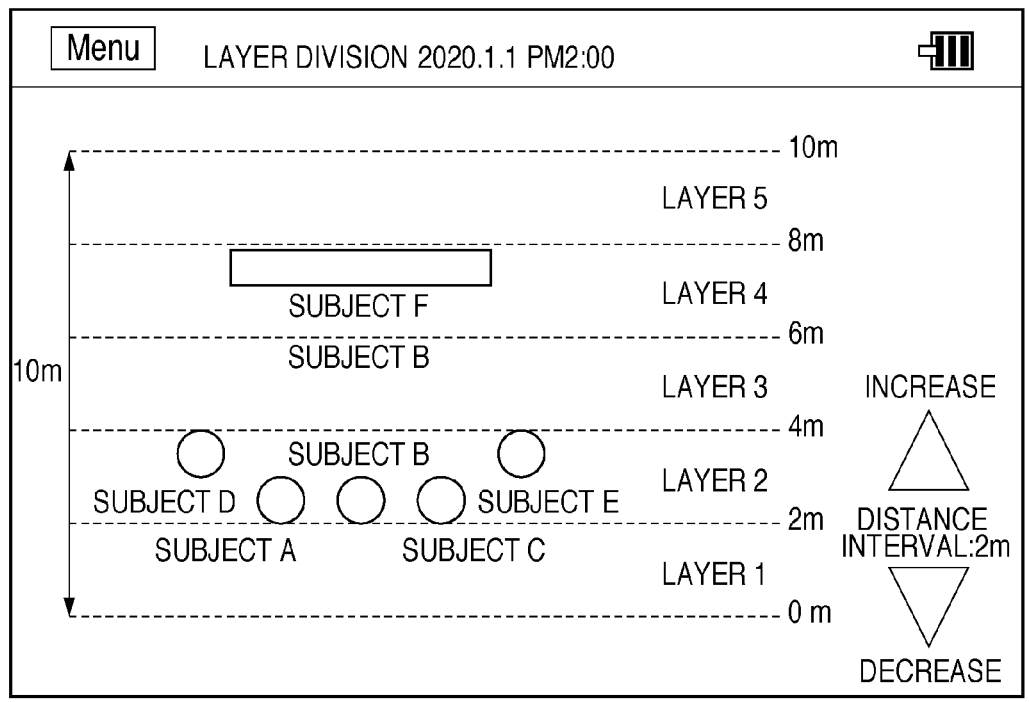

For example, when the user sets to divide a captured image into layers at 2-m intervals by operating the operation input unit 115, the layer dividing unit 110 divides a digital image at 2-m intervals, so that images having distances to the subjects which fall within the same distance range belong to the same layer. More specifically, the layer dividing unit 110 divides so that the subjects A, B, C, D, and E belong to layer 2 having a distance=2 m to the reference subject, and the subject F belongs to layer 4 having a distance=6 m to the reference subject. At this time, the image display unit 108 displays the positional relationship of the subjects using grid lines having the set 2-m intervals, as shown in FIG. 12B.

In this embodiment, the user sets the distance interval to a subject, which is respectively set for continuous layers. Alternatively, the distance interval may be automatically set based on distributions of distances to subjects included in a range image, so that subjects are classified into different layers for respective distances on which the distributions are concentrated.

When shooting modes such as a sports mode, portrait mode, and landscape mode can be set in the digital camera 100, the distance interval to a subject, which is respectively set for continuous layers, may be automatically set according to the set shooting mode. For example, in the portrait mode, assuming that subjects are located at short distances, a distance interval to the reference subject may be set to be 1 m. Also, in the landscape mode, assuming that subjects are located at distant positions, a distance interval to the reference subject may be set to be 10 m.

A main subject detector 111 detects a subject as a main subject from a digital image output from the image processor 105, and identifies the position of the main subject in a frame. In this embodiment, the following description will be given under the assumption that the main subject detector 111 detects a person as a main subject, and identifies the position of that person. The main subject detector 111 is configured by a face detection unit and face recognition unit (neither are shown), and recognizes a face that matches a face which is registered in advance as a main subject from those of persons detected by the face detection unit. More specifically, the face detection unit computes, for example, wavelet transforms of an image, and applies pattern matching to the wavelet transform result, thereby detecting faces of persons. The face recognition unit captures in advance an image of a face of a person who is to be recognized as a main subject before image capturing, and stores it in the ROM 117. Then, the face recognition unit compares feature amounts of faces detected by the face detection unit with those of the face of the person to be recognized as the main subject, thereby identifying the face of the main subject.

Note that this embodiment has explained the method of identifying a main subject by detecting a face, which is registered in advance, from those detected by the face detection unit by the face recognition unit. However, for example, when the main subject detector 111 is configured by only the face detection unit, a face having the largest area or that which faces the front of those detected in an image may be detected as a main subject.

A main layer detector 112 sets, as a main layer, a layer including the main subject detected by the main subject detector 111 of those of an image divided by the layer dividing unit 110. For example, when the subject 1203 is registered in advance as the face of a person to be recognized as a main subject in FIG. 12A, since the main subject detector 111 recognizes the position of the subject 1203 in the image as that of the main subject, layer 3 between grid lines of 2 m and 3 m is set as the main layer. The image display unit 108 may highlight the layer to which the main subject belongs and its position by superimposing, for example, hatching patterns so as to allow the user to identify layer 3 as the main layer and the subject 1203 as the main subject.

Note that this embodiment has explained the method of deciding the main subject and main layer by identifying a person. However, the main subject is not limited to a person. For example, when a distance to a subject as a main subject is decided in settings of a shooting mode as a function of the digital camera 100, a layer of a range including the corresponding distance may be set as the main layer. Alternatively, a distance range to an identical subject, which includes the largest number of regions of the distributions of distances to subjects included in a range image, may be recognized as including a main subject, and the corresponding layer may be set as a main layer.

An image scaling processor 113 applies resolution conversion (enlargement and reduction processes) to image data for respective layers of an image divided by the layer dividing unit 110. More specifically, images of respective layers are respectively resized at magnifications designated in the controller 116, and are stored in, for example, a RAM (not shown). An image composition processor 114 composites the respective layers of the image divided by the layer dividing unit 110 or those resized by the image scaling processor 113, and outputs one composite image. More specifically, the image composition processor 114 composites a plurality of layers so that layers having shorter distances to the reference subject, which are set for continuous layers, are overlaid as upper layers.

The operation input unit 115 is an input interface which includes, for example, a release button, menu button, and touch panel included in the digital camera 100, and is used to detect user inputs, and informs the controller 116 of information input by user's operations.

Figure 5A:
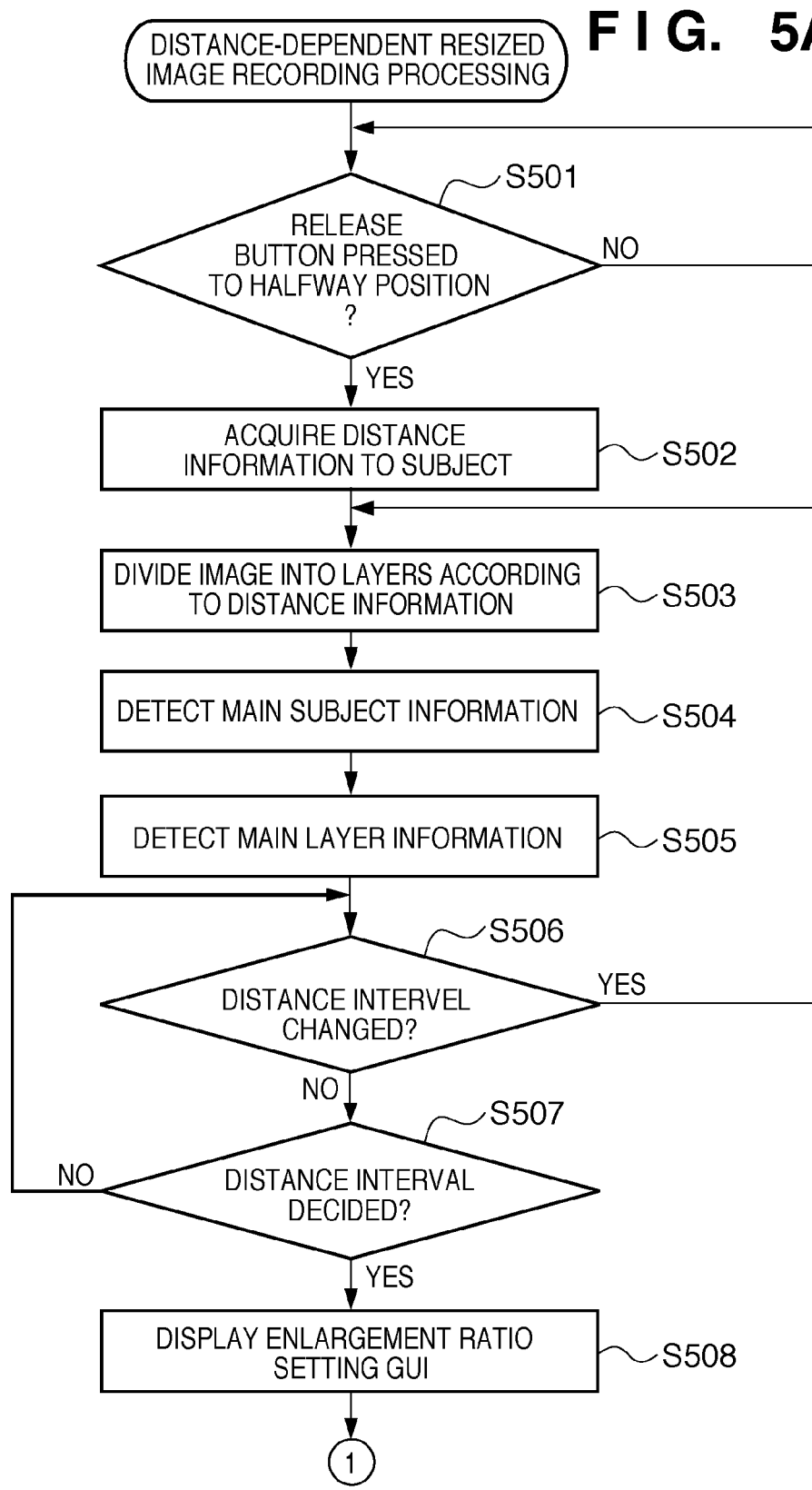
FIGS. 5A and 5B are flowcharts of distance-dependent resized image recording processing according to the first embodiment.
Figure 5B:
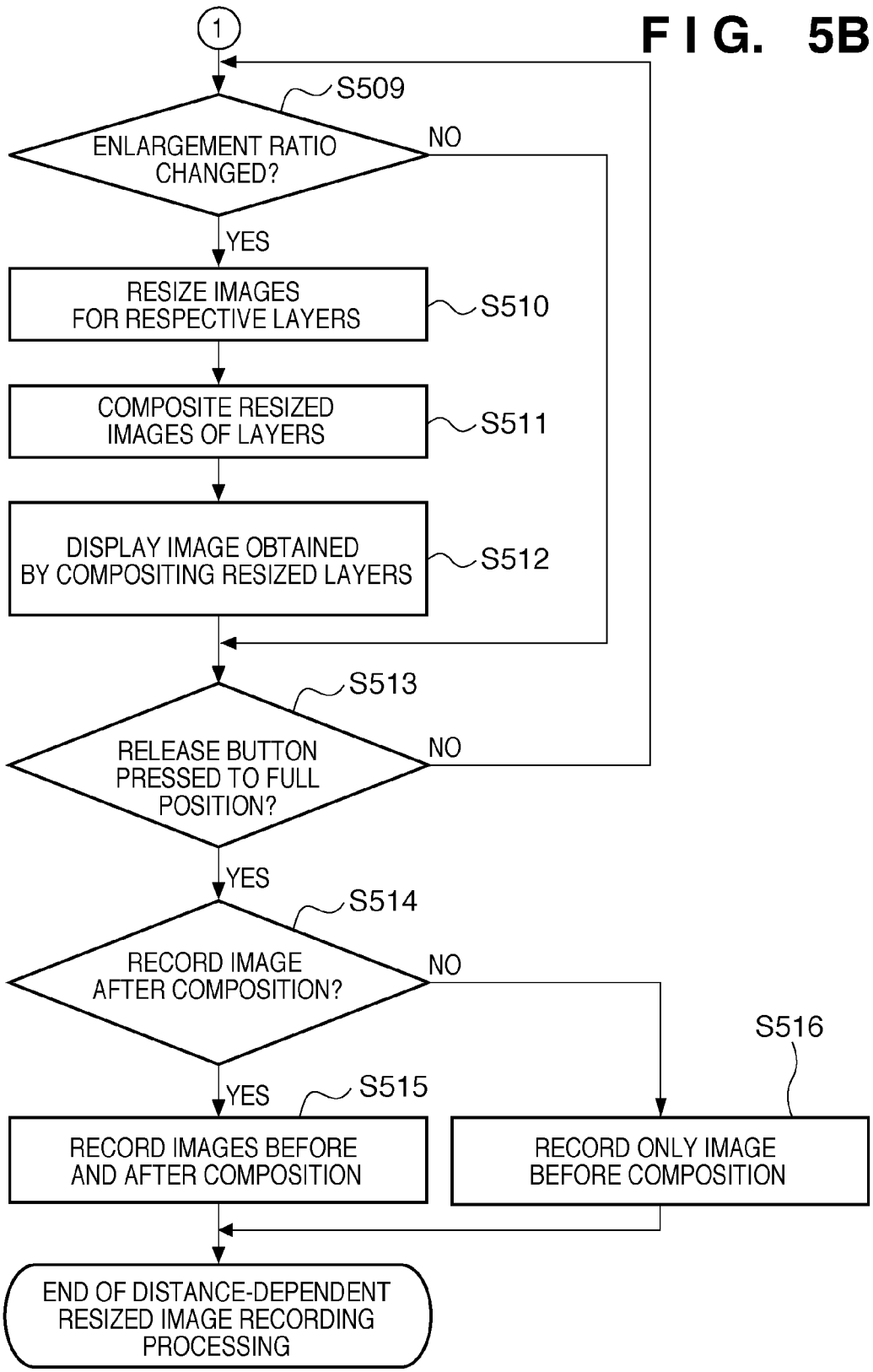

The distance-dependent resized image recording processing of the digital camera of this embodiment with the aforementioned arrangement will be described in more detail below with reference to the flowchart shown in FIGS. 5A and 5B. Assume that in this flowchart, the subjects A, B, C, D, and E are located with respect to the digital camera 100, as shown in FIG. 13A, when the user captures an image using the digital camera 100, and an image is divided into layers at 1-m intervals of subject distances, as shown in FIG. 12A. Also, assume that in this flowchart, when a subject image is through-displayed on the image display unit 108 of the digital camera 100 and is ready to be captured, the user selects a distance-dependent resized image capturing operation as a shooting function of the digital camera 100 by his or her operation.

The controller 116 checks in step S501 if the user presses the release button included in the operation input unit 115 to a halfway position. More specifically, if the user presses the release button in a halfway state, the controller 116 acquires information indicating that the release button is pressed in a halfway state from the operation input unit 115. If the user does not press the release button in a halfway state, the controller 116 repeats the process in step S501. If the user presses the release button in a halfway state, the controller 116 controls the ROM 117 to store a digital image, which is currently displayed on the image display unit 118, that is, which is output from the image processor 105, as a target image of the distance-dependent resized image recording processing. Furthermore, the controller 116 outputs the target image of the distance-dependent resized image recording processing to the layer dividing unit 110, and advances the process to step S502.

In step S502, the distance information acquisition unit 107 obtains a distance information by measuring distances to subjects within an image capturing range, and outputs a range image based on the distance information to the layer dividing unit 110 in accordance with an instruction from the controller 116.

In step S503, the layer dividing unit 110 divides the digital image input in step S501 into layers for respective distance ranges according to pieces of distance information to subjects of respective regions in the image capturing range (or re-setting a distance interval (to be described later)), which are included in the range image, in accordance with an instruction from the controller 116. More specifically, the controller 116 reads out unit information (1 m), which is stored in, for example, the ROM 117 and defines a distance range of divided layers, and transfers the readout information to the layer dividing unit 110. Then, the controller 116 controls the layer dividing unit 110 to classify respective distance measurement regions of the range image into layers different by respective distance ranges in accordance with pieces of distance information to subjects included in the range image. More specifically, the layer dividing unit 110 classifies the respective distance measurement regions corresponding to, for example, pixels of the range image into a distance range which is less than 1 m, that which is not less than 1 m and less than 2 m, ..., that which is not less than 9 m and less than 10 m, and that which is not less than 10 m. Furthermore, the controller 116 divides regions corresponding to the respective distance measurement regions of the range image in the digital image, which is input in step S501, into layers according to information of the distance range to be divided, and sets pieces of distance information to a reference subject in the respective layers. Then, the controller 116 controls the ROM 117 to store the respective layers obtained by dividing the image, and pieces of distance information to the reference subject, which are set in the continuous layers.

In step S504, the controller 116 outputs the target image of the distance-dependent resized image recording processing, which is stored in the ROM 117, to the main subject detector 111, and controls the main subject detector 111 to detect a main subject included in the image. The main subject detector 111 detects the main subject in the input image in accordance with an instruction of the controller 116. More specifically, the controller 116 controls the main subject detector 111 to extract regions of faces of persons from the image using the face detection unit. Furthermore, the controller 116 controls the main subject detector 111 to execute pattern matching between the extracted face regions of the persons and information of a face of a person to be recognized as the main subject, which is stored in, for example, the ROM 117, so as to identify the main subject. Then, the controller 116 acquires position information in the target image of the distance-dependent resized image recording processing, where the face region of the main subject identified by the main subject detector 111 is located, and controls the ROM 117 to store that information as position information of the main subject. Note that the following description will be given under the assumption that the ROM 117 stores information of a face of the subject 1203 as information of a face of a person to be recognized as the main subject in this embodiment.

In step S505, the controller 116 transfers the position information of the main subject stored in the ROM 117, and the range image acquired by the distance information acquisition unit 107 to the main layer detector 112, and controls the main layer detector 112 to detect a layer where the main subject is located. More specifically, the main layer detector 112 refers to distance information to a subject of the distance measurement region corresponding to the position information of the main subject in the range image, and identifies distance information to the main subject in accordance with an instruction of the controller 116. In the example of FIG. 12A, the distance information to the subject 1203 as the identified main subject is identified as "2 m" based on pieces of distance information to subjects included in the range image. Furthermore, the controller 116 reads out the unit information, which is stored in the ROM 117 and defines the distance ranges of the divided layers, transfers that information to the main layer detector 112, and controls the main layer detector 112 to identify a layer, in which an image of the main subject is divided, based on the distance information to the main subject. In the example of FIG. 12A, a main layer including the subject 1203 as the identified main subject is identified as a range having distance information=2 m to the reference subject (a range which is not less than 2 m and is less than 3 m). The controller 116 controls the ROM 117 to store the obtained information of the main layer.

Figure 8:
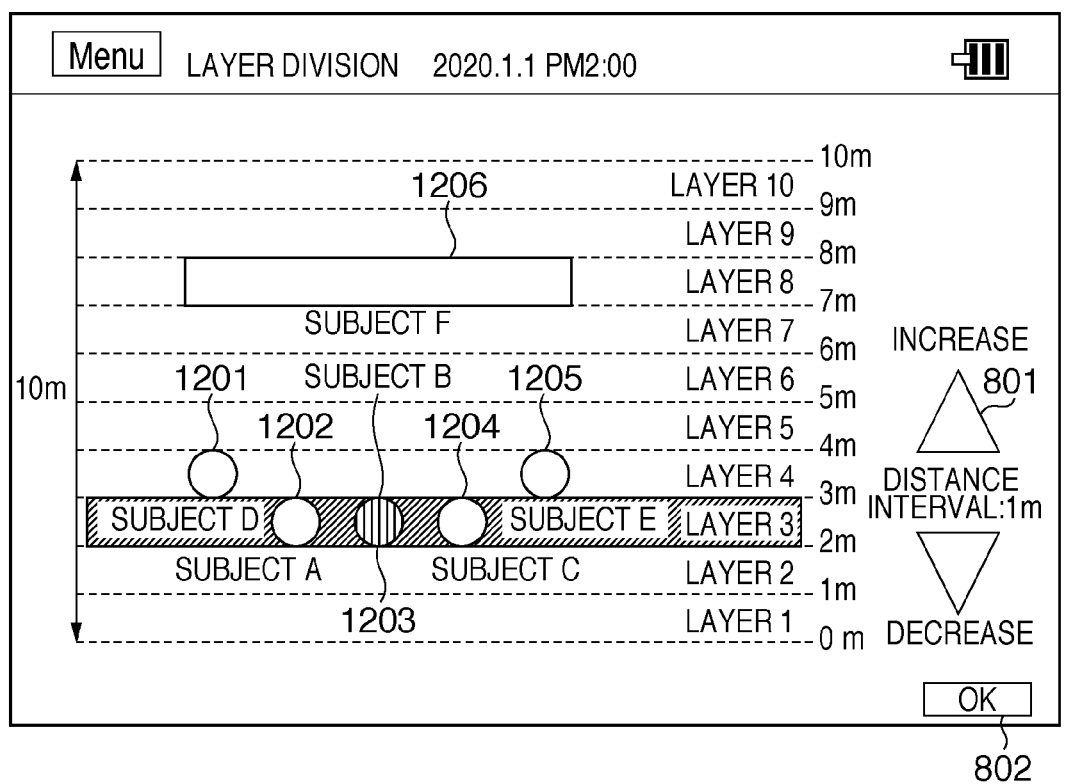
FIG. 8 shows a display example of a distance interval setting GUI according to the first embodiment.

In step S506, the controller 116 determines whether or not an interval of distances to the reference subject (distance interval), which is set for the respective continuous layers upon dividing into layers in step S503, is changed by the user. More specifically, the controller 116 controls the image display unit 108 to display a distance interval setting GUI, which allows the user to arbitrarily re-set the distance interval. In this embodiment, the distance interval setting GUI includes distance interval setting buttons 801 used to change a distance interval and a distance interval decision button 802 used to decide a distance interval together with a simple view (display image) indicating the layers and the positional relationship of the subjects, as shown in, for example, FIG. 8. The image display unit 108 highlights the main subject and main layer, and the user can change the distance interval by operating the distance interval selection buttons 801 using the operation input unit 115. If the user changes the distance interval, which is set for the continuous layers, by operating the distance interval selection buttons 801, the controller 116 returns the process to step S503 and updates the distance interval setting GUI by executing the process of layer dividing and the process of main layer detecting. Otherwise, the controller 116 advances the process to step S507. Note that the simple view showing the layers and the positional relationship of the subjects displays intervals of distances to the reference subject, which are respectively set for the continuous layers, and the positional relationship of the subjects. Note that the distance interval setting GUI is not particularly limited to that shown in FIG. 8, as long as a GUI allows the user to set a distance interval to the reference subject, which is respectively set for the continuous layers.

The controller 116 checks in step S507 whether or not the user decides the distance interval to the reference subject, which is set for the continuous layers, by operating the distance interval decision button 802 using the operation input unit 115. If the distance interval to the reference subject, which is respectively set for the continuous layers, is decided, the controller 116 advances the process to step S508; otherwise, it returns the process to step S503 and allows the user to arbitrarily re-set the distance interval.

In step S508, the controller 116 controls the image display unit 108 to display an enlargement ratio setting GUI, so as to prompt the user to set enlargement ratios for respective layers obtained by dividing the captured image in step S503. In this embodiment, a GUI, which is displayed on the image display unit 108 and is used to set an enlargement ratio, displays an image 901 captured when the user presses the release button in the halfway state, and an image 906 obtained by resizing and compositing the respective layers, as shown in, for example, FIG. 9C. However, the enlargement ratio setting GUI is not limited to that which displays images before and after composition, and it need only be displayed to prompt the user to set enlargement ratio of respective layers.

Before the enlargement ratio setting GUI is displayed on, for example, the image display unit 108, the controller 116 creates composite images of reference patterns, which are used as enlargement ratio setting samples of respective layers. More specifically, for example, when the user is allowed to freely set an enlargement ratio of the main layer or other layers, composite images of reference patterns, which are used as enlargement ratio setting samples of respective layers are as follows. As composite images of reference patterns, which are used as enlargement ratio setting samples of respective layers, an image 902 in which an enlargement ratio of the main layer is set to be ×1/2, and an image 903 in which an enlargement ratio of the main layer is set to be ×2 are created, as shown in, for example, FIG. 9C. Also, for example, an image 904 in which an enlargement ratio of layers other than the main layer is set to be ×1/2, and an image 905 in which an enlargement ratio of layers other than the main layer is set to be ×2 are created. More specifically, in case of, for example, an image in which the enlargement ratio of the main layer is set to be ×2, the controller 116 transfers the image of the main layer stored in the ROM 117 to the image scaling processor 113, and controls the image scaling processor 113 to enlarge the image of the main layer to ×2. At this time, since the resolution (size) of the image of the main layer is doubled, the controller 116 need only control the image scaling processor 113 to clip the enlarged image of the main layer at the resolution of the captured image. Then, when the image of the main layer is composited to those of layers other than the main layer in the composition processing of the image composition processor 114, the image resolution need not be adjusted.

Figure 9A:
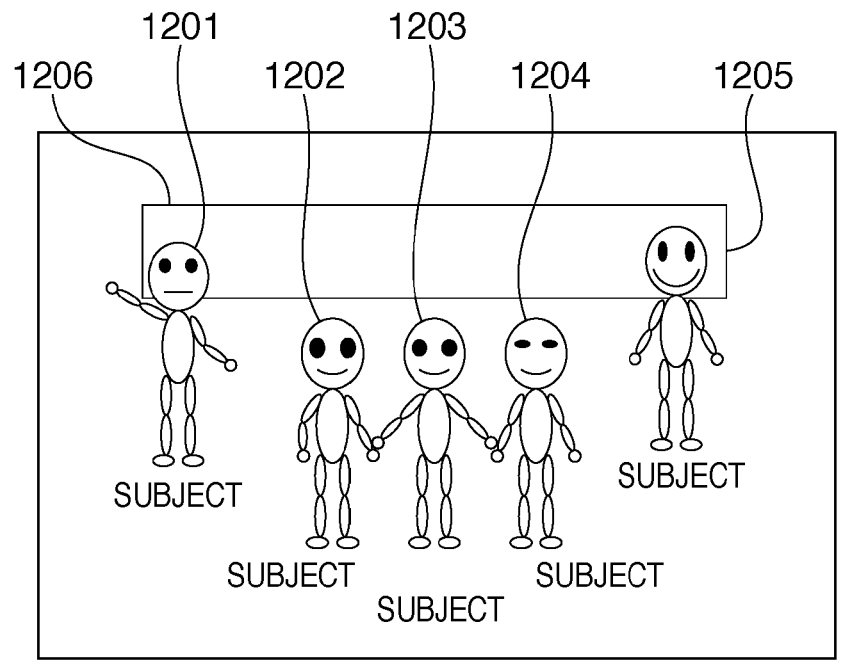
FIGS. 9A, 9B, and 9C show display examples of distance-dependent resized images and an enlargement ratio setting GUI.
Figure 9B:
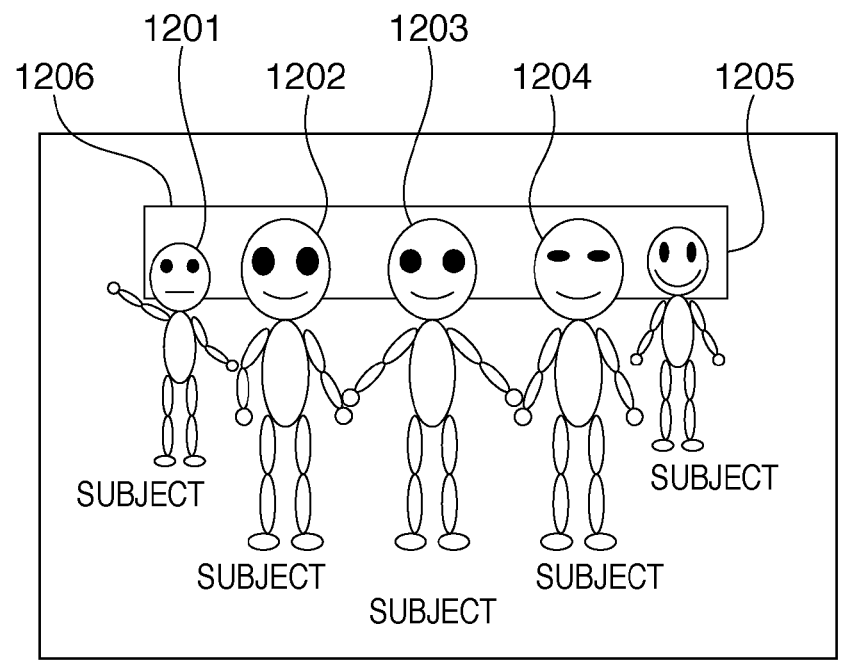

Then, the controller 116 inputs the images of layers other than the main layer, which are stored in the ROM 117, and that of the main layer enlarged in by the image scaling processor 113, to the image composition processor 114, and controls the image composition processor 114 to composite the images of all the layers. At this time, the controller 116 controls the image composition processor 114 to composite the images of respective layers to have a correct positional relationship of the respective layers according to the pieces of distance information to the reference subject, which are set for the continuous layers. As a result, the image composition processor 114 can obtain a composite image obtained by resizing only the image of the main layer to ×2 from the captured image (FIG. 9A), as shown in FIG. 9B. The controller 116 need only store composite images used as enlargement ratio setting samples of respective layers, which are obtained by composition in the image composition processor 114, in the RAM (not shown).

In the composition processing of the respective layers in the image composition processor 114, since the images of the layers are resized, a region including no information may be generated upon overlaying the images of the respective layers. That is, since the respective layers are configured by images obtained by dividing a single image captured in the halfway pressing state of the release button, an image of a layer which has a long distance to a subject does not include any image information included in a region of an image having a short distance. For this reason, when image information disappears from a region, which originally includes image information in the layer having the short distance, as a result of resizing of the layer having the short distance, a region including no image information may be formed even after all the layers are composited. In such case, the controller 116 controls the image composition processor 114 to execute interpolation processing by estimating the region including no image information after all the layers are overlaid from image information around that region.

After the controller 116 controls the image composition processor 114 to composite all composite images as enlargement ratio setting samples of respective layers, it controls the image display unit 108 to display the enlargement ratio setting GUI stored in the ROM 117 and the composite images as enlargement ratio setting samples of respective layers, which are stored in the RAM. Also, the controller 116 reads out the captured image as the target image of the distance-dependent resized image recording processing, which is stored in the ROM 117, outputs it to the image display unit 108, and controls the image display unit 108 to display the captured image. Then, the controller 116 controls the image display unit 108 to display the enlargement ratio setting GUI shown in FIG. 9C, and prompts the user to set an enlargement ratio. The enlargement ratio setting GUI includes a button 907 used to select an enlargement ratio setting mode, a button 908 used to select a layer for which an enlargement ratio is set, a button 909 used to allow the user to select an enlargement ratio from a pull-down list, and an adjustment bar 910 used to allow the user to decide an enlargement ratio in detail. The user can set respective items using selection key buttons included in the operation input unit 115 or by directly operating buttons on a screen, for example, when the image display unit 108 has a touch panel function.

Also, when a captured image is divided into layers according to distances to subjects, and the layers are composited by setting enlargement ratios for the respective layers as in this embodiment, a pseudo wide angle-side zoom function can be implemented. That is, a pseudo state in which the digital camera 100 is moved closer to subjects to capture an image while an image capturing range of the digital camera 100 (a range included in a captured angle of view) remains unchanged can be created.

Figure 11A:
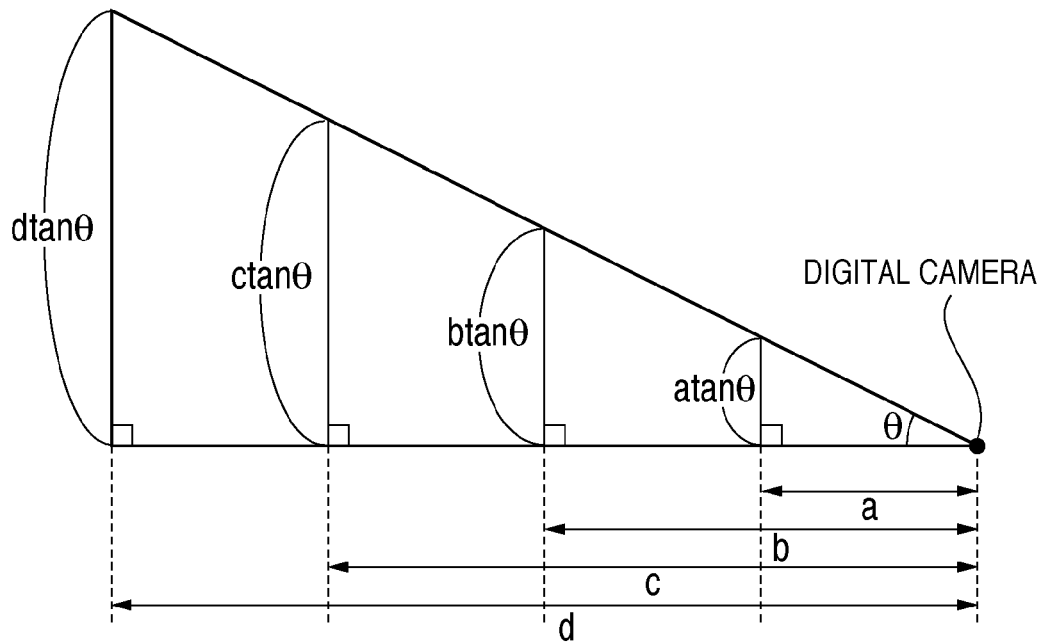
FIGS. 11A and 11B are views for explaining a pseudo wide angle-side zoom function.
Figure 11B:
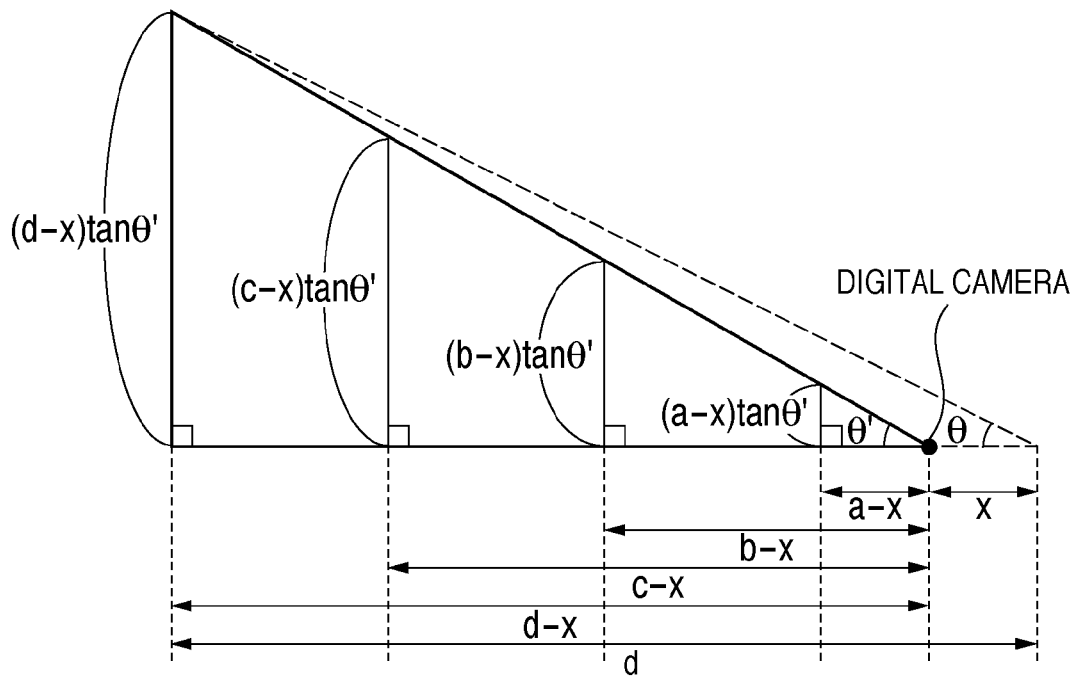

The pseudo wide angle-side zoom function will be described in detail below with reference to FIGS. 11A and 11B. FIG. 11A represents, for example, half heights of image capturing ranges in the vertical direction according to distances to subjects when the half of an angle of view in the vertical direction as the image capturing range of the digital camera 100 is θ. Letting a, b, c, and d be distances in ascending order from the digital camera 100 to subjects, heights each obtained by multiplying a product of the distance to the subject and tan θ are included in the image capturing ranges in the vertical direction. At this time, for example, as shown in FIG. 11B, when the position of the digital camera 100 is moved closer to a subject by x, and the digital camera 100 can capture an image capturing range at a distance d−x to a subject, which is the same as that at the distance d to a subject before it is moved closer, the angle of view becomes θ' larger than θ. That is, by resizing images of layers having distances a, b, and c to subjects, a pseudo image captured at a wide angle-side by moving the position of the digital camera 100 closer by x can be created.

Normally, when the digital camera 100 is moved closer to a subject by x in practice, for example, an image capturing range (a half thereof) of a layer having a distance a−x to the subject is given by:

(a−x)tan θ

At this time, when the digital camera 100 is moved closer to the subject by x, a subject image, which is captured by a layer having the distance a to the subject before the digital camera 100 is moved closer by x, is resized within the image capturing range to be captured to:

$$\frac{a \cdot \tan\theta}{(a-x)\tan\theta} = \frac{a}{a-x} \text{ times}$$

Also, when an image is captured to have an angle of view=θ' when the digital camera 100 is moved closer by x, since the image capturing range of a layer having a distance a−x to a subject is given by:

(a−x)tan θ' it becomes a range of:

$$\frac{(a-x)\tan\theta'}{(a-x)\tan\theta} = \frac{\tan\theta'}{\tan\theta} \text{ times}$$

with respect to the image capturing range of a layer having the distance a−x to the subject, which is captured to have an angle of view=θ. That is, when the digital camera 100 is moved closer to the subject by x to change the angle of view from θ to θ', the subject image captured by a layer having the distance a to the subject is resized within the image capturing range to be captured to:

$$\frac{(a/(a-x))}{(\tan\theta'/\tan\theta)} \text{ times}$$

In this case, letting a, b, c, and d be the distances to the reference subject of layers that divide a captured image, as shown in FIG. 11B, the layer having the largest distance d from the subject will be examined as an image capturing range when the digital camera 100 is moved closer by x to capture an image to have the angle of view=θ'. That is, if an image of the layer having the distance d to the reference subject in that captured by the digital camera 100 is defined as a reference of the pseudo wide angle-side zoom function, that is, an image capturing range of the pseudo wide angle-side zoom function, the following equation holds:

$$\theta' = \arctan\left(\frac{d \cdot \tan\theta}{d-x}\right) \text{ (arctan is an arctangent)}$$

By calculating tangents of both the sides of this equation, we have:

$$\tan\theta' = \frac{d \cdot \tan\theta}{d-x}$$

That is, when the digital camera 100 is moved closer to the subject by x to change the angle of view from θ to θ' upon capturing an image, the subject image, which captured by a layer having the distance a to a subject before the digital camera 100 is moved closer by x, is resized, by substituting the above equation, within the image capturing range to be captured to:

$$\frac{a}{a-x} \cdot \frac{d-x}{d} \text{ times}$$

More specifically, in order to generate an image that has undergone the pseudo wide angle-side zoom processing, the aforementioned magnifications are calculated for images of respective layers, and the images of the respective layers are resized and composited. For example, a case will be examined below wherein a captured image is divided into four layers, as shown in FIGS. 11A and 11B, distances to a reference subject of layers 1 to 4 are respectively 2.5 m, 5 m, 7.5 m, and 10 m, and an image of layer 4 is set as a reference image capturing range of the pseudo wide angle-side zoom processing. When a pseudo wide angle-side zoom image is to be generated upon moving the digital camera 100 closer to the subject by 1 m, the enlargement ratios of images of the respective layers are:

$$\text{Layer 1: } \frac{2.5}{2.5-1} \cdot \frac{10-1}{10} = 1.5 \text{ times}$$

$$\text{Layer 2: } \frac{5}{5-1} \cdot \frac{10-1}{10} = 1.125 \text{ times}$$

$$\text{Layer 3: } \frac{7.5}{7.5-1} \cdot \frac{10-1}{10} = 1.038 \text{ times}$$

$$\text{Layer 4: } \frac{10}{10-1} \cdot \frac{10-1}{10} = 1 \text{ times}$$

Note that when a pseudo wide angle-side zoom image upon moving the digital camera 100 closer to the subject by 2.5 m or more is to be generated in the aforementioned example, the enlargement ratio of layer 1 assumes a negative value or it cannot be calculated. In such case, that is, when a pseudo wide angle-side zoom image upon moving the digital camera 100 closer by a distance equal to or larger than that of each layer to the subject is to be generated, composition of the corresponding layer may be skipped. More specifically, when the controller 116 controls the image scaling processor 113 to decide enlargement ratios of images of respective layers, it checks based on the distances to the subject of the respective layers and pseudo distance information by which the digital camera 100 is moved closer in the pseudo wide angle-side zoomed image whether or not to resize respective layers. The user can select the pseudo wide angle-side zoom function by operating the button 907 used to select an enlargement ratio setting mode on the enlargement ratio setting GUI shown in FIG. 9C which is displayed on the image display unit 108 under the control of the controller 116 in this step. When the user sets the enlargement ratio setting mode to be the wide angle-side zoom function, for example, as the images 902 to 905, composite images created by changing a pseudo distance by which the digital camera 100 is moved closer can be displayed as those used as enlargement ratio setting samples. When the enlargement ratio setting mode is set to be the wide angle-side zoom function, the function of the button 908 used to select a layer for which an enlargement ratio is set is switched to select a reference layer of the image capturing range of the wide angle-side zoom function. Likewise, the functions of the button 909 used to allow the user to select an enlargement ratio from a pull-down list, and the adjustment bar 910 used to allow to decide an enlargement ratio in detail can be switched to be able to respectively adjust the pseudo distance by which the digital camera is moved closer.

Figure 9C:
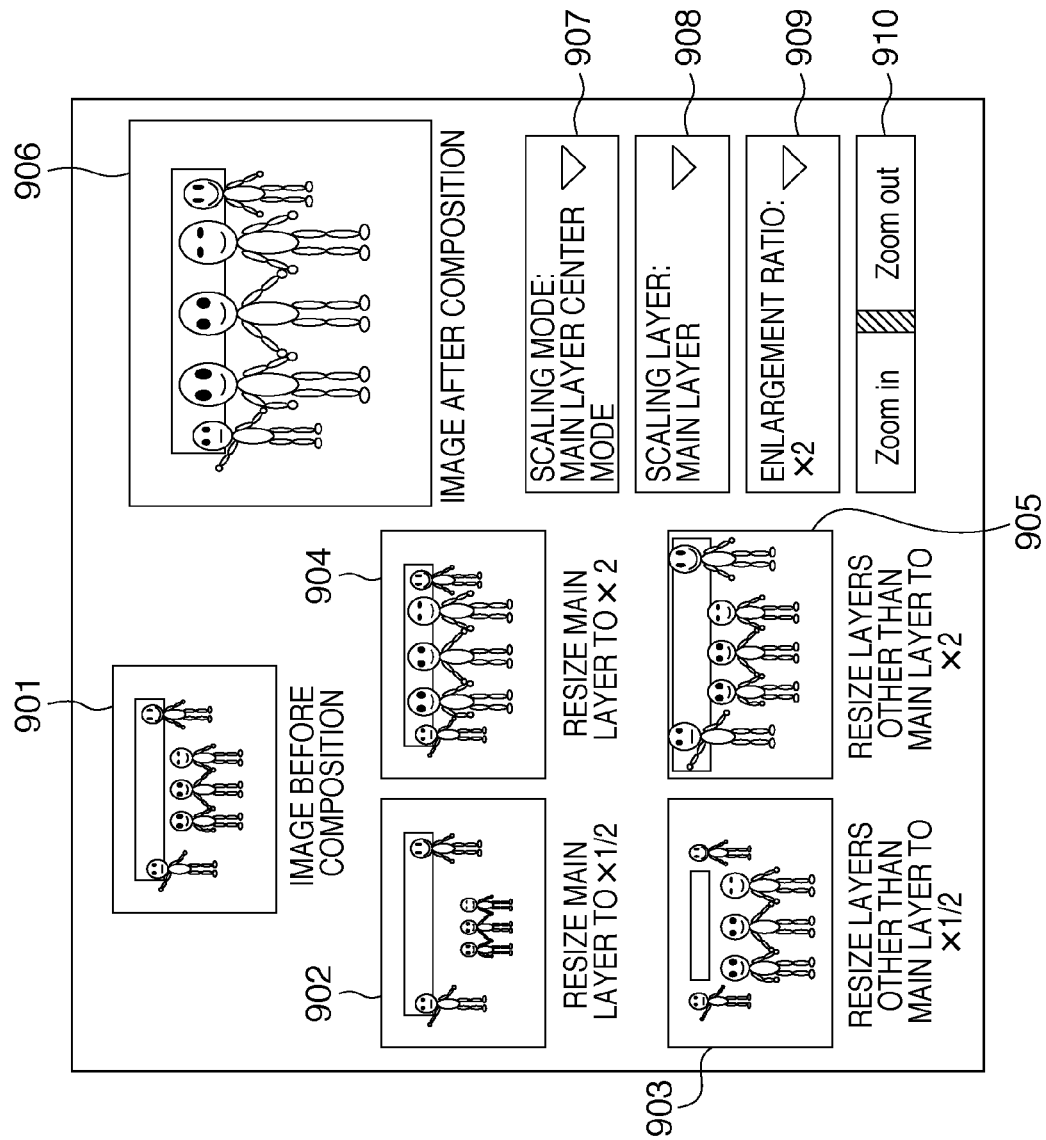

As described above, after the controller 116 controls the image display unit 108 to display the enlargement ratio setting GUI in this step, it advances the process to step S509. The controller 116 checks in step S509 if the enlargement ratio setting operation has been done by user's operations made on the operation input unit 115. More specifically, the controller 116 checks if a preview display of an image after composition, displayed on an area of the image 906 in FIG. 9C, is changed based on enlargement ratio settings changed by the user who makes operations on the operation input unit 115 while confirming the enlargement ratio setting GUI. When the enlargement ratio setting GUI is displayed on the image display unit 108 for the first time, an image captured in a halfway pressing state of the release button is displayed as the images 901 and 906 before and after composition. When the enlargement ratio settings are changed, an image created by resizing and compositing layers according to the set enlargement ratios of the respective layers is displayed on the area of the image 906 after composition. If the operation made on the operation input unit 115 is the enlargement ratio setting operation, the controller 116 stores the changed enlargement ratio settings in the ROM 117, and advances the process to step S510; otherwise, the controller 116 jumps the process to step S513.

In step S510, the controller 116 outputs the enlargement ratio setting information changed in step S509, and images of the respective layers of the target image of the distance-dependent resized image recording processing, which are stored in the ROM 117, to the image scaling processor 113. Then, the controller 116 controls the image scaling processor 113 to resize the images of the respective layers according to the enlargement ratio setting information.

In step S511, the controller 116 controls the image composition processor 114 to execute composition processing of the images of the respective layers resized in step S510 according to the pieces of distance information to the reference subject of the respective layers, so that layers having smaller distances to the subject are overlaid as upper layers. Note that when the enlargement ratio setting mode is set to be the wide angle-side zoom function, composition of a layer having a distance to the reference subject, which is smaller than a pseudo distance by which the digital camera 100 is moved closer, is skipped, as described above.

In step S512, the controller 116 outputs a composite image obtained by the composition processing by the image composition processor 114 to the image display unit 108, and controls the image display unit 108 to display that image at the position of the image 906 on the enlargement ratio setting GUI. The user confirms the image 906 after composition, which is displayed by making the enlargement ratio setting operation, and can decide whether or not to generate a composite image from an actually captured image obtained by making an actual image capturing operation based on the current enlargement ratio settings. If the user decides to generate a composite image, for example, he or she need only press the release button in a full state. In step S513, the controller 116 controls the operation input unit 115 to check if the release button is set in a full pressing state. If the release button is set in a full pressing state, the controller 116 advances the process to step S514; otherwise, it returns the process to step S509.

In step S514, the controller 116 executes actual image capturing processing. That is, using an image to be recorded acquired by the actual image capturing operation, a composite image is generated according to the enlargement ratio settings of the respective layers decided in the processes up to step S513, in addition to the image to be recorded. More specifically, the controller 116 stores, as a target image of the distance-dependent resized image recording processing, an image to be recorded, which is obtained by converting a subject image formed on the image sensor 102 upon pressing the release button in a full state by the respective blocks, in the ROM 117. Then, the controller 116 controls the layer dividing unit 110 to divide the target image into a plurality of layers according to distances to subjects in accordance with a range image acquired by the distance information acquisition unit 107. The controller 116 controls the image scaling processor 113 and image composition processor 114 to execute predetermined processes according to the enlargement ratio setting information stored in the ROM 117, thus obtaining a composite image generated from the image to be recorded. The controller 116 then outputs the obtained composite image to the image display unit 108, and controls the image display unit 108 to display the composite image together with a GUI that prompts the user to select whether or not to record the composite image. The controller 116 checks if the user makes an operation to record the composite image on the operation input unit 115. If the user makes the operation to record the composite image, the controller 116 advances the process to step S515, and records the image to be recorded captured by the actual image capturing processing and the composite image output from the image composition processor 114 on the recording medium 109. On the other hand, if the user does not make any operation to record the composite image, the controller 116 advances the process to step S516, and records only the image to be recorded captured by the actual image capturing processing on the recording medium 109.

As described above, the image capturing apparatus of this embodiment can generate an image obtained by resizing subject images in a captured image for respective distances to subjects. More specifically, the image capturing apparatus measures distances to subjects upon capturing an image. Then, the image capturing apparatus divides the captured image into a plurality of layers to have a set distance interval, so that subjects which are located within the same distance range belong to the same layer. Furthermore, the image capturing apparatus sets enlargement ratios respectively for the plurality of divided layers to execute resizing processing. The image capturing apparatus composites the resized layers so that layers having smaller distances to subjects are overlaid as upper layers, thus obtaining an image obtained by resizing subject images for respective distances to the subjects.

The image capturing apparatus can generate a pseudo image, which seemed like an image captured by changing the angle of view and the image capturing position back and forth, without moving an actual image capturing position to change an angle of view. More specifically, the image capturing apparatus sets distances to a reference subject for layers divided depending on distance ranges to subjects. Also, the image capturing apparatus sets an image of one layer of those of the divided layers as a layer used to specify an angle of view of an image to be generated. When a pseudo image captured at a position by moving the image capturing apparatus closer to a subject by a given distance is to be generated, an enlargement ratio to be decided for each layer can be expressed using x (constant) as the given distance, a distance a between that layer and the reference subject, and a distance d between the layer used to specify the angle of view and the reference subject. More specifically, images of the respective layers are resized at enlargement ratios $$\frac{a}{a-x} \cdot \frac{d-x}{d}$$

and the resized images are composited, thereby generating a pseudo image captured by changing the angle of view upon moving the image capturing position back and forth.

(Second Embodiment)

Another embodiment of the present invention will be described in detail hereinafter with reference to the drawings. Note that the embodiment to be described hereinafter will explain an example in which the present invention is applied to a personal computer (to be referred as a PC hereinafter) as an example of an image processing apparatus, which can analyze meta information included in an input image to acquire distance information between a subject and an image capturing apparatus which captured an image of the subject. The following description will be given under the assumption that meta information of an image includes distance information between a subject and the image capturing apparatus which captured an image of the subject. However, the present invention is applicable to an arbitrary apparatus which can acquire an input image, and distance information between a subject in the image and the image capturing apparatus which captured the image.

Figure 6:
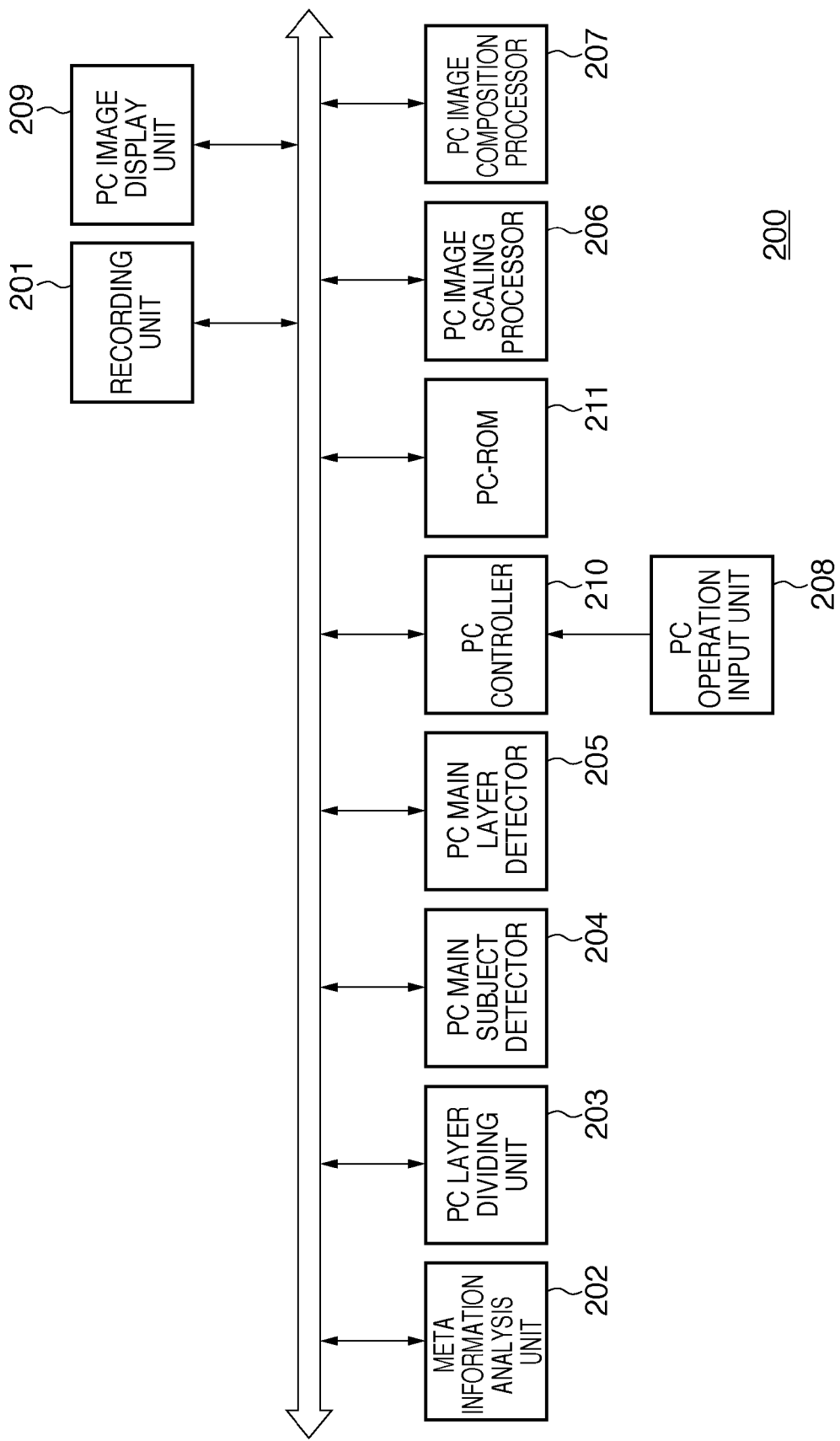
FIG. 6 is a block diagram showing the functional arrangement of a PC according to the second embodiment.

FIG. 6 is a block diagram showing the functional arrangement of a PC according to the embodiment of the present invention.

A PC controller 210 is, for example, a CPU, and controls the operations of respective blocks included in a PC 200. More specifically, the PC controller 210 reads out operation programs, which are stored in, for example, a PC-ROM 211, of the respective blocks included in the PC 200, and expands and executes them on a RAM (not shown), thereby controlling the operations of the respective blocks included in the PC 200. The PC-ROM 211 is a rewritable non-volatile memory, and stores, for example, applications associated with images and setting values required for operations of the respective blocks, in addition to the operation programs of the respective blocks included in the PC 200.

A recording unit 201 is a recording device such as an HDD included in the PC 200, and records images captured by an image capturing apparatus, an OS of the PC 200, and the like. A meta information analysis unit 202 analyzes meta information included in each image recorded in the recording unit 201, and analyzes distance information between a subject and the image capturing apparatus which captured that image. The distance information between a subject and the image capturing apparatus, which captured an image of the subject, is the distance from the image capturing apparatus to the subject, which is measured at the time of capturing of the image and is set for, for example, each pixel or each region of the image. The analyzed information is transferred to a PC layer dividing unit 203. FIG. 10 shows an example of meta information appended when each image recorded in the recording unit 201 was captured by the image capturing apparatus. The meta information shown in FIG. 10 includes pieces of distance information to subjects for respective X-Y coordinates of an image in addition to an image file name and date & time information.

The PC layer dividing unit 203 divides an image (image to be processed) having meta information including the pieces of analyzed distance information into a plurality of layers according to distances to subjects based on the pieces of input distance information between subjects and the image capturing apparatus which captured the image. More specifically, the PC layer dividing unit 203 classifies the pieces of distance information between the subjects and the image capturing apparatus which captured the image for respective predetermined distance ranges, and divides the image to generate the plurality of layers, so that pixels or images of regions, which are classified as belonging to the same distance range, belong to the same layer. The PC layer dividing unit 203 sets pieces of distance information to a reference subject for the respective layers obtained by dividing the image, and controls the PC-ROM 211 to store the layers and the positional relationship of the layers.

A PC main subject detector 204 detects a subject as a main subject from the image to be processed, and identifies a position of the main subject in the image. In this embodiment, as in the first embodiment described above, assume that the PC main subject detector 204 recognizes a face, which matches a face registered in advance, as the main subject from detected faces of persons. A PC main layer detector 205 sets, as a main layer, a layer including the main subject detected by the PC main subject detector 204 of those of the image divided by the PC layer dividing unit 203. For example, when a subject 1203 is registered in advance as a face of a person to be recognized as the main subject in FIG. 12A, since the PC main subject detector 204 recognizes the position of the subject 1203 in the image as that of the main subject, layer 3 is set as the main layer. Note that this embodiment has explained the method of detecting a subject as a main subject by the PC main subject detector 204. However, position information of a main subject may be decided, for example, when an image is captured, and may be included in meta information of that image. In this case, the PC main subject detector 204 may be excluded from the functional arrangement of the PC 200, and the position information of the main subject analyzed by the meta information analysis unit 202 may be output to the PC main layer detector 205.

A PC image scaling processor 206 applies resolution conversion (enlargement and reduction processes) to image data of respective layers of the image divided by the PC layer dividing unit 203. More specifically, images of the respective layers are resized at magnifications designated in the PC controller 210, and are stored in, for example, a RAM (not shown). A PC image composition processor 207 composites the respective layers of the image divided by the PC layer dividing unit 203 or those resized by the PC image scaling processor 206 and outputs one composite image. More specifically, the PC image composition processor 207 composites the plurality of layers so that layers having smaller distances to a reference subject, which are set for the respective layers, are overlaid as upper layers.

A PC operation input unit 208 is an input interface which includes, for example, a mouse, keyboard, and touch panel included in the PC 200, and is used to detect user inputs. The PC operation input unit 208 informs the PC controller 210 of information input by user's operations. A PC image display unit 209 is, for example, a display device such as an LCD which is detachably attached, and is used to display, for example, images recorded in the recording unit 201 and GUIs of applications of the PC 200.

Figure 7A:
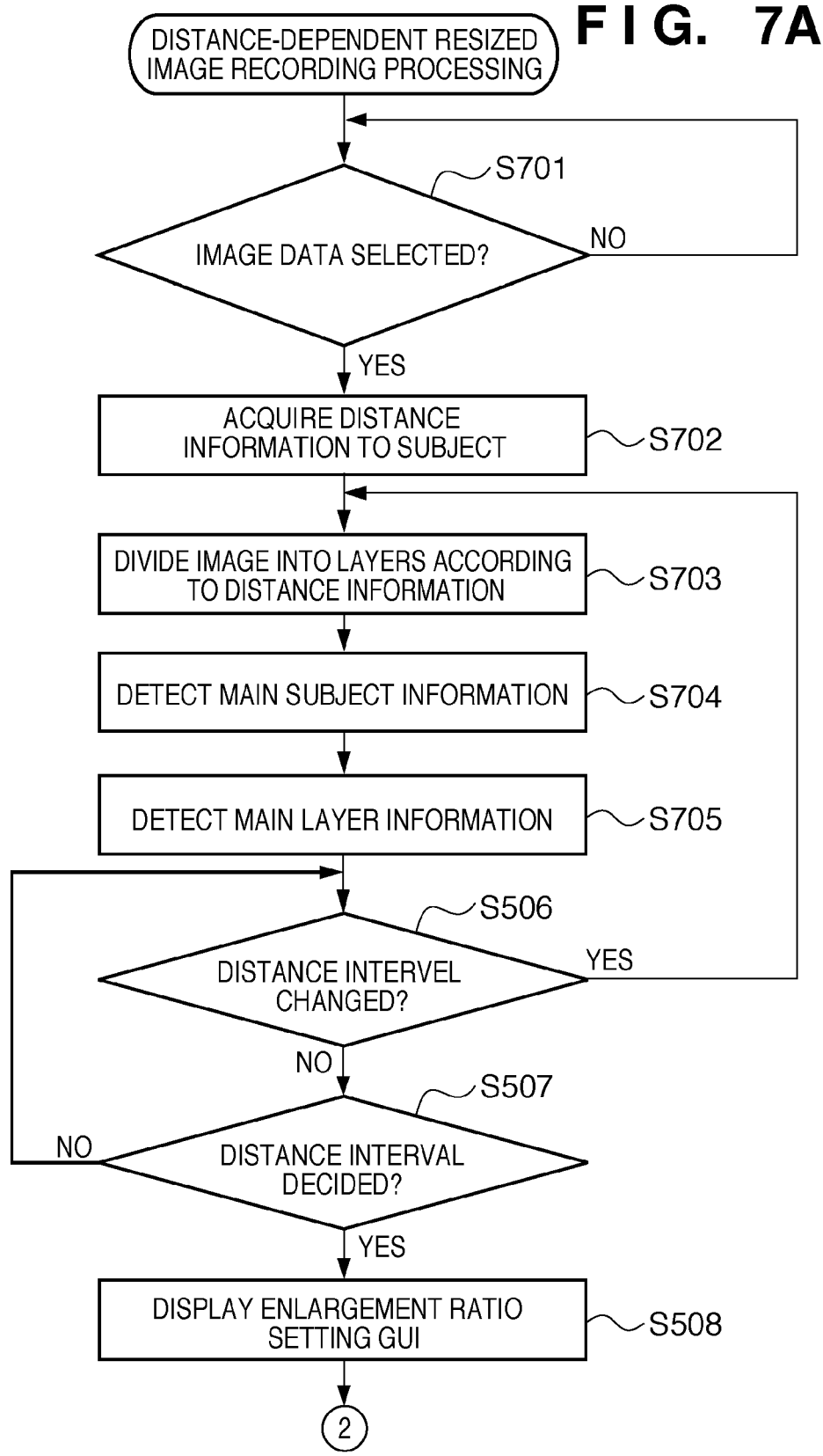
FIGS. 7A and 7B are flowcharts of distance-dependent resized image generation processing according to the second embodiment.
Figure 7B:
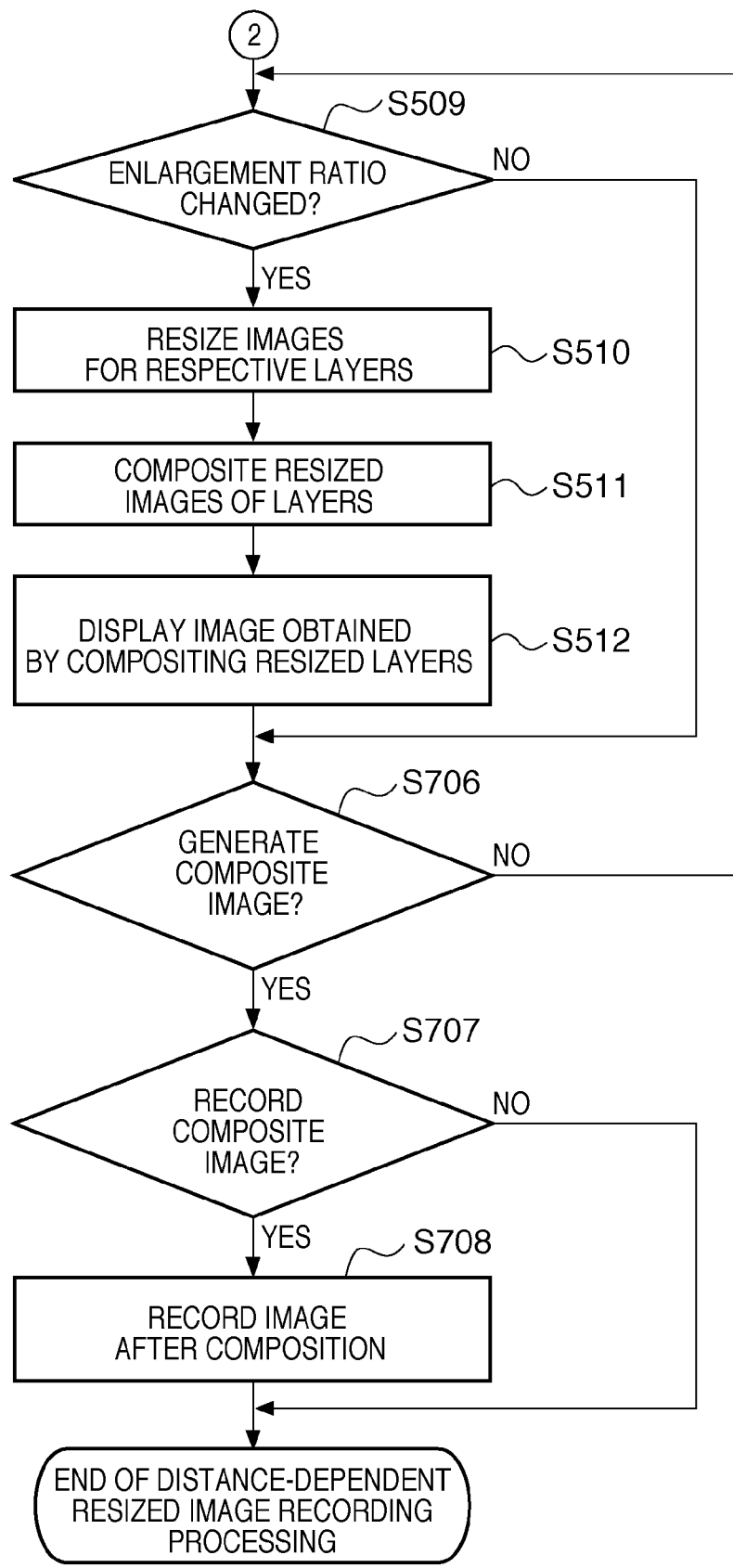

Distance-dependent resized image generation processing of the PC of this embodiment with the aforementioned arrangement will be described in more detail below with reference to the flowchart shown in FIGS. 7A and 7B. Assume that this flowchart is started, for example, when the user launches a distance-dependent resized image generation application so as to generate a distance-dependent resized image using the PC 200. Also, assume that this distance-dependent resized image generation processing generates a distance-dependent resized image using the same distance interval setting GUI display and enlargement ratio setting GUI display as those of the distance-dependent resized image recording processing of the aforementioned first embodiment. For this reason, the same step numbers denote the steps which execute the same processes as in the aforementioned distance-dependent resized image recording processing, and a description thereof will not be repeated. Also, assume that as for the steps which execute the same processes as in the first embodiment, the corresponding blocks included in the PC 200 execute operations as operation main bodies. The corresponding blocks in the PC 200 in the steps which execute the same processes as in the first embodiment correspond those shown in FIGS. 7A and 7B, which are prefixed with "PC" to the same names as the respective blocks included in the digital camera 100 shown in FIG. 1. That is, assume that the operation main bodies change like that the block of the PC 200 corresponding to the controller 116 is the PC controller 210.

The PC controller 210 checks in step S701 if the user selects an image for which a distance-dependent resized image is to be generated. More specifically, the PC controller 210 controls, for example, the PC image display unit 209 to display a GUI that prompts the user to select a target image of the distance-dependent resized image generation processing, and to display a list of images recorded in the recording unit 201 included in the PC 200. Then, the PC controller 210 checks if the user makes a selection input of a target image of the distance-dependent resized image generation processing to the PC operation input unit 208. If a target image of the distance-dependent resized image generation processing is selected, the PC controller 210 advances the process to step S702. If no target image of the distance-dependent resized image generation processing is selected, the PC controller 210 can repeat the process in step S701. Assume that images to be displayed in the list of images from which the user selects a target image of the distance-dependent resized image generation processing in this step are those which each include meta information including pieces of information of distances (distance information) between subjects and the image capturing apparatus upon capturing that image. In this case, as for information indicating whether or not meta information included in an image includes distance information, when an image is recorded in the recording unit 201, the PC controller 210 may control the meta information analysis unit 202 to analyze meta information included in that image, and to record that information in the recording unit 201 in advance in association with the image. Note that this embodiment will give the following description under the assumption that the images to be displayed in the list of images from which the user selects a target image of the distance-dependent resized image generation processing are those each of which includes meta information including distance information. However, the present invention is not limited to this. For example, when the user selects a target image of the distance-dependent resized image generation processing, the PC controller 210 may control the meta information analysis unit 202 to analyze meta information of the target image in step S702 (to be described later) to check if the meta information includes distance information. In this case, if the selected target image does not include any distance information, the PC controller 210 may notify the user that a distance-dependent resized image cannot be generated via the PC image display unit 209, and may return the process to step S701.

In step S702, the PC controller 210 controls the meta information analysis unit 202 to analyze meta information included in the target image selected by the user in step S701, and transfers pieces of obtained information of distances between subjects and the image capturing apparatus, which are included in the meta information, to the PC layer dividing unit 203.

In step S703, the PC controller 210 copies the target image, which is selected by the user in step S701 and is recorded in the recording unit 201, and transfers the copy to the PC layer dividing unit 203. The PC controller 210 then controls the PC layer dividing unit 203 to divide the input target image into layers for respective ranges of the distances between the subjects and image capturing apparatus in accordance with the pieces of distance information (or re-setting the distance interval) between the subjects and the image capturing apparatus, which are input from the meta information analysis unit 202. Also, the PC controller 210 sets pieces of distance information between a reference subject and the image capturing apparatus in the respective layers obtained by dividing the target image, and controls the PC-ROM 211 to store the layers and the pieces of distance information between the reference subject and the image capturing apparatus of the respective layers.

In step S704, the PC controller 210 copies the target image and transfers the copy to the PC main subject detector 204.

Then, the PC controller 210 controls the PC main subject detector 204 to detect, for example, face regions included in the target image, and to recognize a face which matches that of the main subject stored in, for example, the PC-ROM 211 from the detected face regions as a face of the main subject. The PC controller 210 transfers information of the position of the obtained face region of the main subject in the target image, and the respective layers of the target image, which are divided by the PC layer dividing unit 203, to the PC main layer detector 205. The PC main layer detector 205 decides a layer having image information at the position of the face region of the main subject as a main layer from the respective layers of the target image in accordance with the input information of the position of the face region of the main subject in the target image (S705). Also, the PC controller 210 stores the determined information of the main layer in the PC-ROM 211.

The PC controller 210 controls the PC image display unit 209 to display a distance interval setting GUI, and executes distance interval setting processing. Furthermore, the PC controller 210 controls the PC image display unit 209 to display an enlargement ratio setting GUI and executes enlargement ratio setting processing of the respective layers of the distance-dependent resized image in steps S508 to S512 and S705. The user confirms an image 906 after composition, which is displayed by making the enlargement ratio setting operation, and can decide if a composite image is generated from the target image using the current enlargement ratio settings. If the user decides generation of a composite image, he or she need only select a decision menu (not shown) using, for example, a mouse included in the PC operation input unit 208, and need only click the button of the mouse. The PC controller 210 checks in step S706 if the user decides that a composite image is generated from the target image using the current enlargement ratio settings by making inputs to the PC operation input unit 208. If it is decided that a composite image is generated, the PC controller 210 advances the process to step S707; otherwise, it returns the process to step S509.

In step S707, the PC controller 210 controls the PC image display unit 209 to clear the displayed enlargement ratio setting GUI and to display a composite image, which is displayed as the image 906 after composition on the enlargement ratio setting GUI and is generated from the target image using the current enlargement ratio settings. Then, the PC controller 210 controls the PC image display unit 209 to display a GUI that prompts the user to select whether or not to record the composite image, and checks if the user makes the operation to record the composite image on the PC operation input unit 208. If the user makes the operation to record the composite image, the PC controller 210 advances the process to step S708, and records the obtained composite image in the recording unit 201. If the user does not make any operation to record the composite image, the PC controller 210 can end the distance-dependent resized image generation processing.

As described above, when an input image has distance information between subjects in the image and the image capturing apparatus which captured the input image, the image processing apparatus of this embodiment can generate an image which is resized for respective distances to the subjects. More specifically, the image processing apparatus divides the input image into a plurality of different layers to have a set distance interval according to the distance information between subjects and the image capturing apparatus, which is measured upon capturing the input image, so that subjects which are located within the same distance ranges belong to the same layer. The image processing apparatus sets enlargement ratios for the plurality of divided layers to execute resizing processing, and composites the resized layers so that layers having shorter distances to subjects are overlaid as upper layers, thereby obtaining an image which is resized for respective distances to subjects.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-285741, filed Dec. 16, 2009, and 2010-235878, filed Oct. 20, 2010, which are hereby incorporated by reference herein in their entirety.

What is claimed is:

1. An image capturing apparatus comprising:
an image capturing unit that captures an image including a first subject and a second subject, wherein the first subject corresponds to a main subject;
a distance measurement unit that measures a first distance which corresponds to a distance to the first subject and a second distance which corresponds to a distance to the second subject;
a dividing unit that divides the captured image into layers including a first layer and a second layer based on the first distance and the second distance, wherein the first layer includes the first subject and the second layer includes the second subject;
a combined image generating unit that generates a first combined image, a second combined image, a third combined image, a fourth combined image, and a fifth combined image; and
a display unit that displays the first combined image, the second combined image, the third combined image, the fourth combined image, and the fifth combined image,
wherein the first combined image includes the first layer which is resized based on a first ratio, and the second layer which is not resized based on the first ratio,
the second combined image includes the first layer which is resized based on a second ratio larger than the first ratio, and the second layer which is not resized based on the second ratio,
the third combined image includes the first layer which is not resized based on the first ratio, and the second layer which is resized based on the first ratio,
the fourth combined image includes the first layer which is not resized based on the second ratio, and the second layer which is resized based on the second ratio, and
the fifth combined image includes the first layer which is resized based on a ratio selected by a user, and the second layer which is resized based on a ratio selected by the user.

2. The image capturing apparatus according to claim 1, further comprising a control unit that controls the image capturing apparatus to store the fifth combined image in a storage medium.

3. The image capturing apparatus according to claim 1, further comprising a control unit that controls the image capturing apparatus to store the captured image and the fifth combined image in a storage medium.

4. The image capturing apparatus according to claim 1, wherein the image capturing apparatus is capable of acting as a digital camera.

5. A method comprising:
- causing an image capturing unit to capture an image including a first subject and a second subject, wherein the first subject corresponds to a main subject;
- measuring a first distance which corresponds to a distance to the first subject and a second distance which corresponds to a distance to the second subject;
- dividing the captured image into layers including a first layer and a second layer based on the first distance and the second distance, wherein the first layer includes the first subject and the second layer includes the second subject;
- generating a first combined image, a second combined image, a third combined image, a fourth combined image, and a fifth combined image; and
- causing a display device to display the first combined image, the second combined image, the third combined image, the fourth combined image, and the fifth combined image,
- wherein the first combined image includes the first layer which is resized based on a first ratio, and the second layer which is not resized based on the first ratio,
- the second combined image includes the first layer which is resized based on a second ratio larger than the first ratio, and the second layer which is not resized based on the second ratio,
- the third combined image includes the first layer which is not resized based on the first ratio, and the second layer which is resized based on the first ratio,
- the fourth combined image includes the first layer which is not resized based on the second ratio, and the second layer which is resized based on the second ratio, and
- the fifth combined image includes the first layer which are resized based on a ratio selected by a user, and the second layer which are resized based on a ratio selected by the user.

6. The method according to claim 5, further comprising storing the fifth combined image in a storage medium.

7. The method according to claim 5, further comprising storing the captured image and the fifth combined image in a storage medium.

8. A non-transitory computer-readable storage medium that stores a program for causing a computer to execute a method, the method comprising:
- causing an image capturing unit to capture an image including a first subject and a second subject, wherein the first subject corresponds to a main subject;
- measuring a first distance which corresponds to a distance to the first subject and a second distance which corresponds to a distance to the second subject;
- dividing the captured image into layers including a first layer and a second layer based on the first distance and the second distance, wherein the first layer includes the first subject and the second layer includes the second subject;
- generating a first combined image, a second combined image, a third combined image, a fourth combined image, and a fifth combined image; and
- causing a display unit to display the first combined image, the second combined image, the third combined image, the fourth combined image, and the fifth combined image,
- wherein the first combined image includes the first layer which is resized based on a first ratio, and the second layer which is not resized based on the first ratio,
- the second combined image includes the first layer which is resized based on a second ratio larger than the first ratio, and the second layer which is not resized based on the second ratio,
- the third combined image includes the first layer which is not resized based on the first ratio, and the second layer which is resized based on the first ratio,
- the fourth combined image includes the first layer which is not resized based on the second ratio, and the second layer which is resized based on the second ratio, and
- the fifth combined image includes the first layer which are resized based on a ratio selected by a user, and the second layer which are resized based on a ratio selected by the user.

9. The non-transitory computer-readable storage medium according to claim 8, the method further comprises storing the fifth combined image in a storage medium.

10. The non-transitory computer-readable storage medium according to claim 8, the method further comprises storing the captured image and the fifth combined image in a storage medium.

* * * * *